US010695707B2

(12) United States Patent
White, Jr.

(10) Patent No.: US 10,695,707 B2
(45) Date of Patent: Jun. 30, 2020

(54) DRUM MEDIA HOLDING BAND FOR FILTRATION SYSTEM

(71) Applicant: Osprey Corporation, Atlanta, GA (US)

(72) Inventor: James Andrew White, Jr., College Park, GA (US)

(73) Assignee: Osprey Corporation, Atlanta, GA (US)

(*) Notice: Subject to any disclaimer, the term of this patent is extended or adjusted under 35 U.S.C. 154(b) by 257 days.

(21) Appl. No.: 15/867,495

(22) Filed: Jan. 10, 2018

(65) Prior Publication Data
US 2018/0280858 A1 Oct. 4, 2018

Related U.S. Application Data

(60) Provisional application No. 62/480,025, filed on Mar. 31, 2017.

(51) Int. Cl.
B01D 46/26 (2006.01)
B01D 46/20 (2006.01)
B01D 46/00 (2006.01)
B01D 46/42 (2006.01)
B01D 33/073 (2006.01)
B01D 33/067 (2006.01)

(52) U.S. Cl.
CPC ......... B01D 46/20 (2013.01); B01D 46/0043 (2013.01); B01D 46/0056 (2013.01); B01D 46/0065 (2013.01); B01D 46/0079 (2013.01); B01D 46/26 (2013.01); B01D 46/4227 (2013.01); B01D 33/067 (2013.01); B01D 33/073 (2013.01); B01D 2273/28 (2013.01)

(58) Field of Classification Search
CPC .................................................. B01D 46/26
USPC ..................................... 55/408; 95/278, 284
See application file for complete search history.

(56) References Cited

U.S. PATENT DOCUMENTS

| 2,678,109 | A | 5/1954 | Vedder |
| 3,472,002 | A | 10/1969 | Brown et al. |
| 5,181,945 | A | 1/1993 | Bodovsky |
| 5,474,598 | A | 12/1995 | Harpole, Jr. et al. |
| 5,871,643 | A * | 2/1999 | Ota ...................... B01D 33/067 210/238 |
| 2016/0001211 | A1 | 1/2016 | Dietz |

FOREIGN PATENT DOCUMENTS

JP H07241413 A 9/1995
NL 1039947 C 6/2014

OTHER PUBLICATIONS

International Search Report and Written Opinion related PCT Application PCT/US2018/013184 dated May 18, 2018, 19 pages.

* cited by examiner

Primary Examiner — Robert A Hopkins
(74) Attorney, Agent, or Firm — Kilpatrick Townsend & Stockton LLP

(57) ABSTRACT

A filtration system includes a rotary drum and a media holding band that is configured to hold a filtration media on an outer surface of the rotary drum. The media holding band includes a strap and a connector. The strap includes a first end and a second end opposite the first end. The connector is configured to secure the first end of the strap relative to the second end of the strap.

18 Claims, 20 Drawing Sheets

DRUM MEDIA HOLDING BAND FOR FILTRATION SYSTEM

REFERENCE TO RELATED APPLICATIONS

This application claims the benefit of U.S. Provisional Application No. 62/480,025, filed Mar. 31, 2017 and entitled DRUM MEDIA HOLDING BAND FOR FILTRATION SYSTEM, the content of which is hereby incorporated by reference in its entirety

FIELD OF THE INVENTION

This application relates to rotary drum filtration systems, and more particularly to media holding bands for holding drum filter media in place while in operation.

BACKGROUND

In rotary drum filtration systems, filtration media is held on a drum. A fan pulls process air through the filtration media and through the drum as clean air, which may be further filtered or processed before being recirculated to a plant or vented into the atmosphere.

During operation, it is important to hold the filtration media in place relative to the drum because the drum typically rotates. Traditionally, media holding bands are all-steel bands that are tensioned with a bolt extending through outwardly extending tabs of the band. These bands are relatively costly to produce, are difficult to handle because of their size and weight, and are difficult to install or remove during replacement and installation of filtration media. Moreover, these bands typically project outwards past the outer surface of the filtration media and may contact various components of the filtration system (such as suction nozzles) and causing damage as the drum rotates during operation. There is therefore a need for media holding bands that are easy to install and minimize damage to other components of the filtration system.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below.

Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a drum filtration system includes a rotary drum and a media holding band configured to hold a filtration media on an outer surface of the rotary drum. In various examples, the media holding band includes a strap having a first end and a second end opposite the first end, and a connector configured to secure the first end of the strap relative to the second end of the strap.

According various examples, a media holding band for a drum filtration system includes a strap having a first end and a second end opposite the first end and a non-metallic connector configured to secure the first end of the strap relative to the second end of the strap. In some examples, at least one of the first end and the second end of the strap includes an attachment loop. In certain aspects, the non-metallic connector includes a first portion proximate the first end and on a first surface of the strap that extends from the first end to the second end, and a second portion engageable with the first portion, the second portion proximate the second end and on a second surface of the strap that is opposite the first surface.

According to some examples, a method of installing filtration media on a rotary drum of a drum filtration system includes positioning the filtration media on the rotary drum, contacting a strap of a media holding band with the filtration media around a diameter of the rotary drum, and holding the filtration media on the rotary drum by securing a first end of the strap of the media holding band relative to a second end of the strap of the media holding band with a connector of the media holding band.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of examples of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
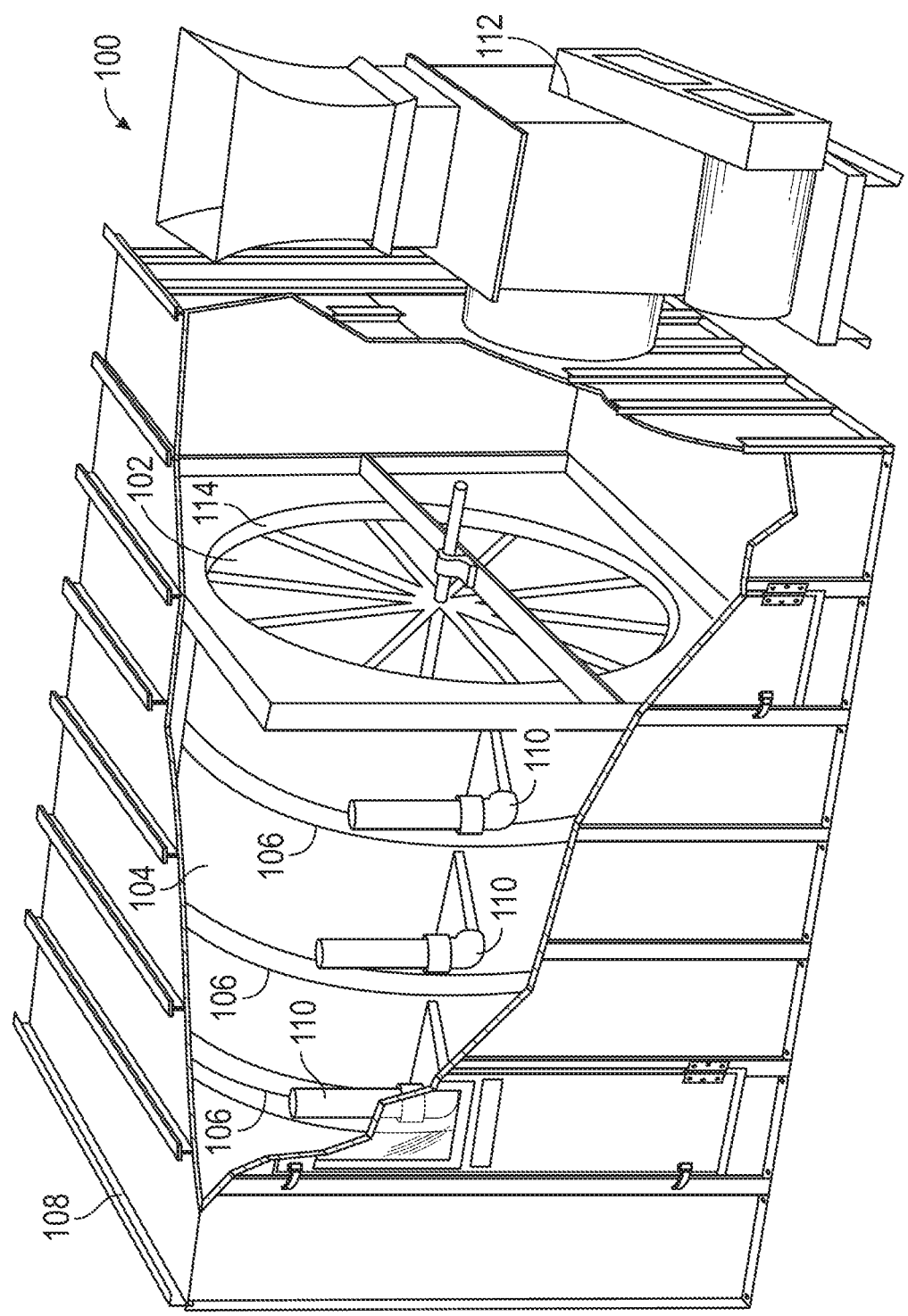
FIG. 1 is a perspective view of a rotary drum filtration system according to aspects of the present disclosure.
Figure 2:
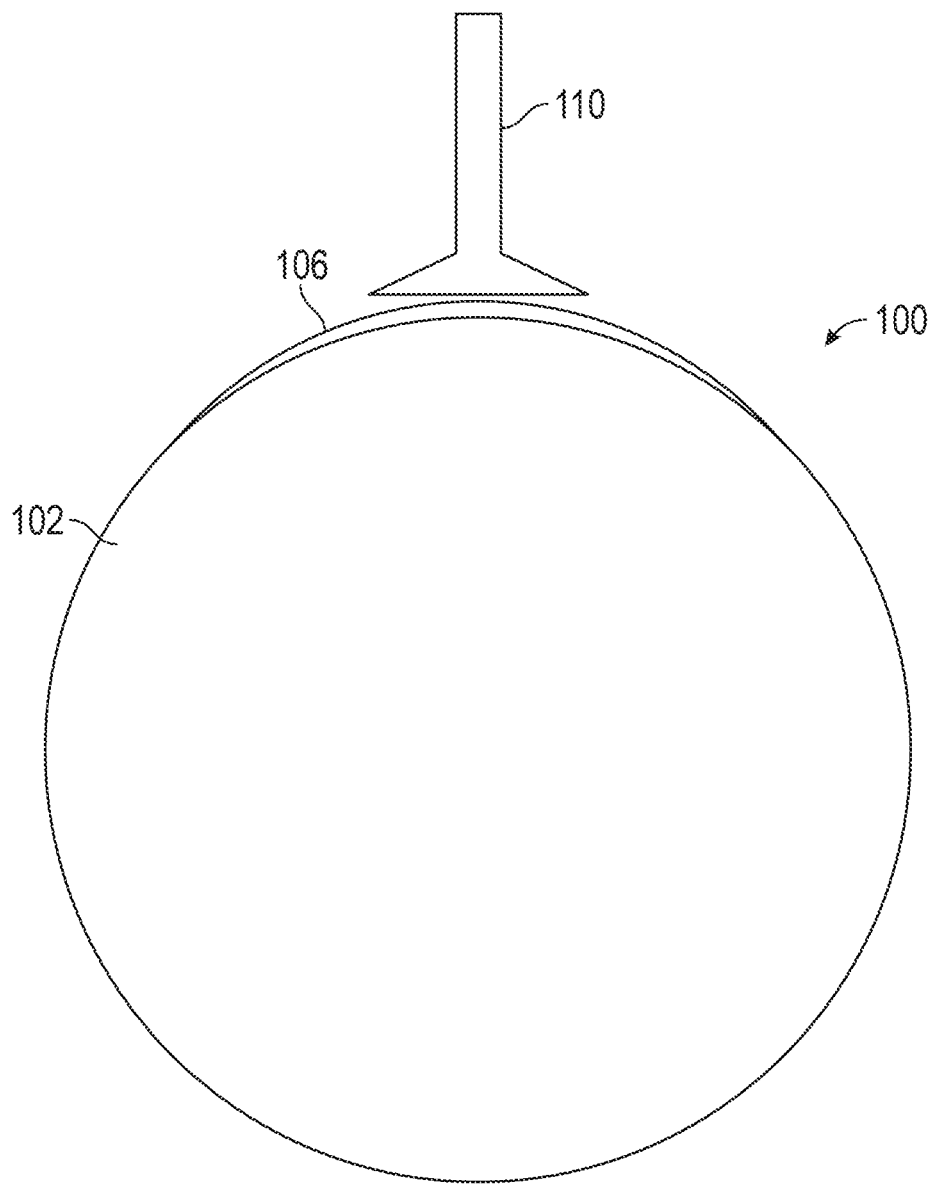
FIG. 2 is a schematic of a side view the rotary drum filtration system of FIG. 1.

FIGS. 1 and 2 illustrate a drum filtration system 100 according to aspects of the present disclosure. The filtration system 100 includes a rotary drum 102, filtration media 104, and at least one media holding band 106 configured to hold the filtration media 104 on an outer surface of the rotary drum 102. The filtration system 100 may also include a filter enclosure 108 in which the rotary drum is rotates, at least one suction nozzle 110 to remove particulates that accumulate on the filtration media 104, and one or more clean air (or main) fans to pull air through the system 100 as described in detail below.

The filtration system 100 may be coupled to a manufacturing system that generates any type of particulates that need to be removed and reclaimed from process air or otherwise as desired. In some optional embodiments, the filtration system 100 is a multi-state drum filtration system 100, and the rotary drum 102 (within the filter enclosure 108) are a first stage of a plurality of filter stages. Further examples of filtration systems are described in detail in U.S. Pat. Nos. 5,679,136, 5,474,598, and U.S. patent application Ser. No. 14/858,581, which are hereby incorporated by reference in their entireties.

During operation of the filtration system 100, process air from the manufacturing process containing waste particulates is fed through a conduit into the filter enclosure 108. The conduit may feed the air and entrained waste particulates at various locations within the filter enclosure 108. The filtration media 104 is held through the one or more media holding bands 106 on the rotary drum 102, which rotates within the filter enclosure 108. Although three media holding bands 106 are illustrated in FIG. 1, it is understood that any desired number of media holding bands 106 may be used as needed.

One end of the rotary drum 102 may be closed off (not shown in FIG. 1) while an opposite end 114 of the rotary drum 102 is in fluid communication with a compartment 112 that houses the one or more clean air, or main, fans for withdrawing the air from the filter enclosure 108. The main fan is used to pull air through the filtration media 104 and then through the open end 114 of the rotary drum 102.

As the rotary drum 102 rotates and as the clean air is pulled through the filtration media 104, particulates settle on the filtration media 104. These particulates are vacuumed off the filtration media 104 through the one or more suction nozzles 110 (or other suitable devices) located along a side or sides of the rotary drum 102. The suction nozzles 110 may be connected to a purge fan (or other suitable device) (not shown) and conduit that route the particulates back to a production line and/or to an offline collection system for disposal. The clean air, which is pulled through the filtration media 104 by the fans of the system 100, is returned to the plant area or is exhausted outside the plant. In some examples, the air pulled through the filtration media 104 may be further pulled through various additional filters (not shown) to further clean the air and remove additional particulates.

In various examples, the rotary drum 102 is generally hollow. An outer surface of the rotary drum 102 is perforated such that air may be pulled through the rotary drum 102. In various examples, the rotary drum 102 may have a diameter ranging from 2 feet to 10 feet, but may have other suitable diameters as needed depending on the volume of air and the concentration of particulates to be removed. The rotary drum 102 typically rotates within the filter enclosure 108 at speeds ranging from 1 RPM to 6 RPM, such as from about 4 RPM to about 6 RPM, but may rotate at other speeds as needed depending on the volume of air that is flowing into the filter enclosure 108 and the concentration of particulates within the air.

The filtration media 104 may be various materials suitable for filtering the particulates from the process air, including, but not limited to, a knit material with a woven acrylic backing, polyester fibers, cotton, Nomex, fiberglass, Kevlar, or various other suitable materials. In some examples, the filtration media 104 may be selected to achieve certain pressure differentials. In various examples, the filtration media 104 has a filtration media height when the filtration media 104 is uncompressed. For example, in various cases, the filtration media height is from about 0.25 inches to about 1 inch, although it is understood that the filtration height may be varied depending on the material used as the filtration media 104. The filtration media 104 is removably held on an outer surface of the rotary drum 102 such that the filtration media 104 can be replaced as needed.

Traditionally, the filtration media 104 has been held onto the rotary drum 102 using the media holding bands, which are all-steel bands that are welded, bolted, or riveted, and optionally painted. Tabs project outwards from the band and protrude past the outer surface of the filtration media 104. To hold the filtration media 104 on the rotary drum 102, each band is wrapped around the rotary drum 102, and then tensioned using a bolt. To provide sufficient tensioning, the bolt typically has a diameter of about ⅜ inches and a length of about 7 inches.

A problem with the media holding bands is that they are relatively costly to produce given their intended function. The size, weight, and bulkiness of the bands also make shipping and delivery of the bands difficult. Moreover, due to their size, weight, and components, the removal or installation of the media holding bands is time consuming. For example, it typically takes an installer 15-20 minutes to uninstall the media holding band from the rotary drum 102 such that the filtration media 104 can be replaced. Another problem with the bands is that during operation, the bolt and/or metal tabs projecting outwards past the outer surface of the filtration media 104 may contact the suction nozzles 110. This contact often causes damage to the suction nozzles 110, resulting in inefficient cleaning of the filtration media 104.

In view of the problems associated with the traditional media holding band, the media holding band 106 has a low profile to eliminate or reduce the height of any portions of the media holding band 106 that may project outwards past the outer surface of the filtration media 104 (e.g., a strap height and/or overlap height). In various examples, a height of the media holding band 106 (e.g., a strap height and/or overlap height) and a tension on the media holding band 106 create the low profile of the media holding band 106, sometimes in combination with a spring-back and/or compression of the filtration media 104. In examples where the media holding band 106 protrudes past the outer surface of the filtration media, the media holding band 106 has a low profile such that a change in elevation or height of the media holding band 106 is gradual (see, e.g., FIG. 2) and not abrupt like the traditional media holding band. The change in height may be a change in the strap height or overlap height. For example, in some cases, when the media holding band 106 is installed, it may have an irregular shape that is a cam-like shape such that the change in height is gradual (see, e.g., FIG. 2). In these examples, the suction nozzles 110 may come into contact with the media holding band 106, but because the height change is gradual, and because the band materials can be non-metallic or of a material less than the hardness of the vacuum nozzles, the nozzles 110 can accommodate the height change without significant damage, if any damage at all.

By minimizing the profile of the media holding band 106, potential damaging contact with the suction nozzles 110 is reduced or eliminated. In some examples, the media holding band 106 may include non-metallic connectors to further reduce potential damaging contact with the suction nozzles 110.

Referring to FIGS. 3-8, the media holding band 106 includes a strap 116 and a connector 118. The strap 116 includes a first end 120, a second end 122 opposite the first end 120, a first surface 124, and a second surface 126 opposite the first surface 124. A distance from the first surface 124 to the second surface 126 is a height of the strap 116 (i.e., strap height), and a distance from the first end 120 to the second end 122 is a length of the strap 116. In various examples, the height of the strap 116 is minimized to reduce or eliminate any projections of the strap 116 beyond the outer surface of the filtration media 104. For example, in some cases, the strap 116 has a height of from about ¹⁄₁₆ inches to about ³⁄₃₂ inches, such as from about ³⁄₃₂ inches to about ⅛ inches. In various examples, the height of the strap 116 may be less than about 25% of the filtration media height. As one non-limiting example, the height of the strap may be about 12.5% of the filtration media height.

In various examples, the strap 116 has a length that accommodates a range of diameters of the rotary drum 102. For example, in some cases, the strap 116 is configured to accommodate a rotary drum 102 having a diameter from about 2 feet to about 12 feet, such as from about 4 feet to about 10 feet, or other desired diameter ranges. In one non-limiting example, the strap 116 accommodates a rotary drum having a diameter of about 8 feet. In another non-limiting example, the strap 116 accommodates a rotary drum having a diameter of about 10 feet. In various examples, the strap 116 can accommodate variations in drum diameter due to manufacturing tolerances or variations in overall diameter due to a height of the filtration media 104. For example, in some cases, the connector 118 (e.g., through engagement portions 132) may allow the strap 116 to accommodate such variations. In further examples, the length of the strap 116 is adjustable. In certain examples, the length of the strap 116 is a fixed length to accommodate a specific nominal drum diameter. Optionally, in such cases, the strap length is adjustable to accommodate variation in actual drum diameter due to manufacturing tolerances or the installation of filter media with varying height.

In various examples, at least one of the first end 120 and the second end 122 includes an attachment loop 128. As described in detail below, the attachment loop 128 is dimensioned to accommodate a securing pin 1116 of a band installer 1100. The strap 116 is constructed from various materials including, but not limited to, synthetic polymers, natural polymers, polyester fabrics, polyester webbing, nylon webbing, various other fabric or woven material, or any other suitable non-metallic material.

The connector 118 is configured to secure the first end 120 of the strap 116 relative to the second end 122 of the strap 116. In various examples, the connector 118 has a low profile such that the height of the connector 118 is minimized compared to the bands 206. For example, in some cases, the connector height may be from about ¹⁄₃₂ inches to about ¹⁄₁₆ inches, such as from about ¹⁄₁₆ inches to about ⅛ inches. In some examples, the connector 118 has a connector height that is less than 50% of the filtration media height. In various examples, the connector height may depend on type of connector used as the connector 118. In some examples, the connector 118 is non-metallic, although it need not be.

Figure 3:
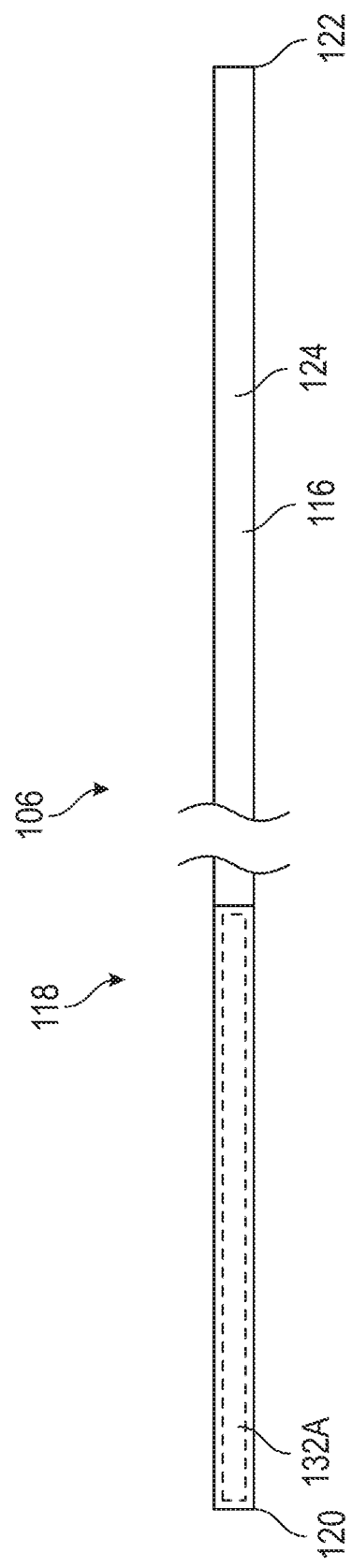
FIG. 3 is a top view of a media holding band of the system of FIG. 1 according to aspects of the present disclosure.
Figure 4:
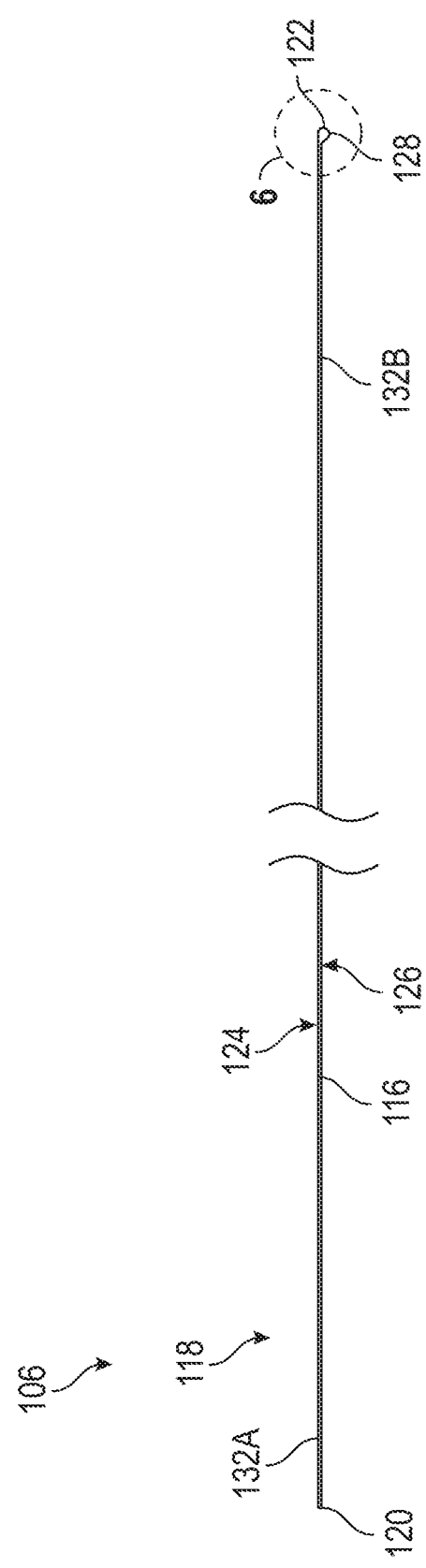
FIG. 4 is a side view of the media holding band of FIG. 3.
Figure 5:
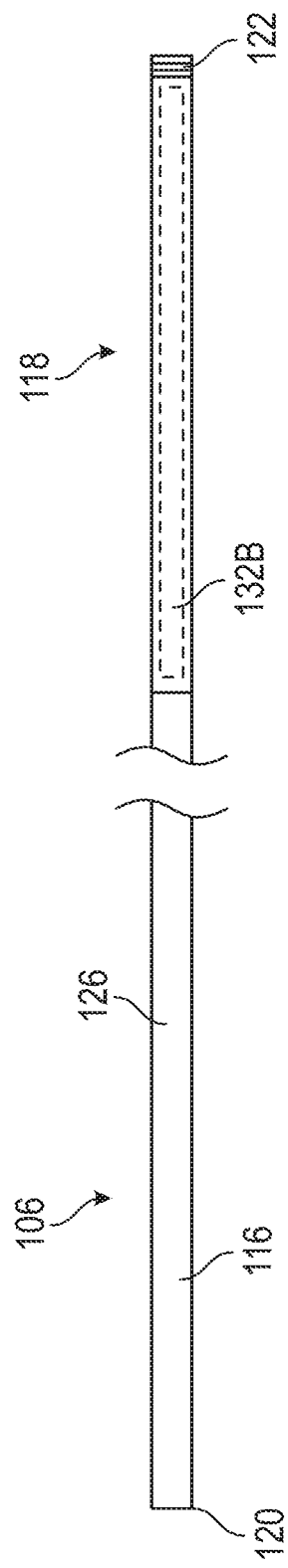
FIG. 5 is a bottom view of the media holding band of FIG. 3.
Figure 6:
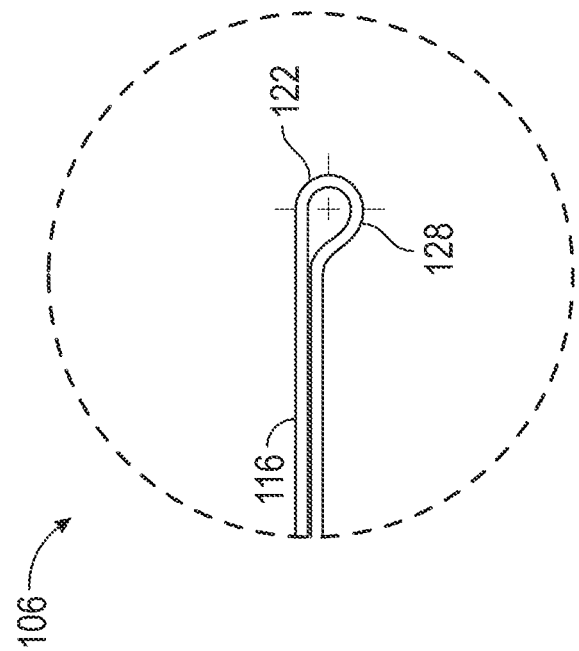
FIG. 6 is an enlarged view of the encircled area in FIG. 4 of the media holding band of FIG. 3.

Referring to FIGS. 3-8, in some examples, the connector 118 is a hook and loop connector that includes a first engagement portion 132A and a second engagement portion 132B that is engageable with the first engagement portion 132A. As illustrated in FIGS. 3 and 4, the first engagement portion 132A is attached to the strap 116 proximate to the first end 120 on the first surface 124. As illustrated in FIGS. 4 and 5, the second engagement portion 132B is attached to the strap 116 proximate to the second end 122 on the second surface 126. In various examples, the first engagement portion 132A and second engagement portion 132B are attached to the strap 116 through various bonding agents, adhesives, stitching, sewing, or various other suitable attachment mechanisms. In some examples, the connector 118 may be removable from the strap 116 or may be fixedly attached (e.g., through stitching, permanent bonding adhesives, etc.). Depending on application, the first engagement portion 132A includes hooks and the second engagement portion 132B includes loops configured to engage the hooks, or vice versa.

The first engagement portion 132A defines a first portion length and the second engagement portion 132B defines a second portion length. In various examples, the first portion length and the second portion length are at least a minimum overlap length. The minimum overlap length is the minimum amount of engagement between the first engagement portion 132A and the second engagement portion 132B to maintain the connection between the first engagement portion 132A and the second engagement portion 132B during operation when the media holding band 106 is on the rotary drum 102. Generally, a minimum overlap length for the connector 118 is increased as the diameter of the rotary drum 102 is increased. For example, a minimum overlap length of a media holding band 106 for a 4 foot diameter drum 102 is less than a minimum overlap length of a media holding band 106 for a 10 foot diameter drum 102. For example, in some cases, the minimum overlap length is from about 10 inches to about 36 inches, such as from about 18 inches to about 30 inches, such as from about 20 inches to about 30 inches. In one non-limiting example, the minimum overlap length is about 24 inches. In various examples, the length of the first portion length is substantially the same as the second portion length, although it need not be.

In these examples where the connector 118 is the hook and loop connector, the type of hook and loop connector is selected to reduce or minimize a height of the connector 118 when the first engagement portion 132A is engaged with the second engagement portion 132B. For example, in various cases, the height of the first engagement portion 132A engaged with the second engagement portion 132B, or an overlap height, is from about 0.16 inches to about 0.19 inches, such as from about 0.20 inches to about 0.50 inches. In some non-limiting examples, the connector 118 may be hook and loop connectors sold under the trade name of Velcro. In some cases, the overlap height may be greater than the strap height, although it need not be.

Figure 7:
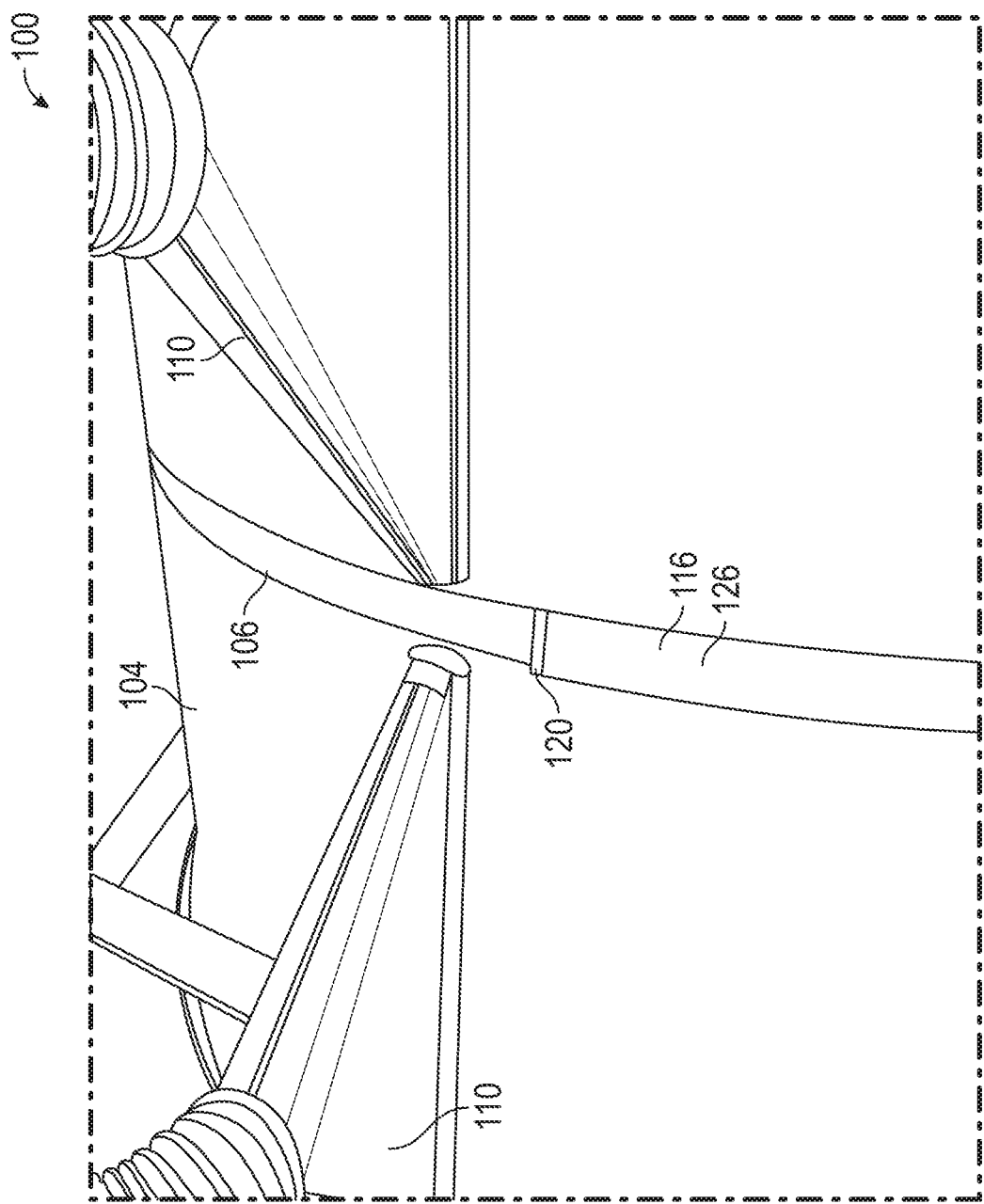
FIG. 7 is a photograph of the media holding band of FIG. 3 on a rotary drum of the system of FIG. 1.
Figure 8:
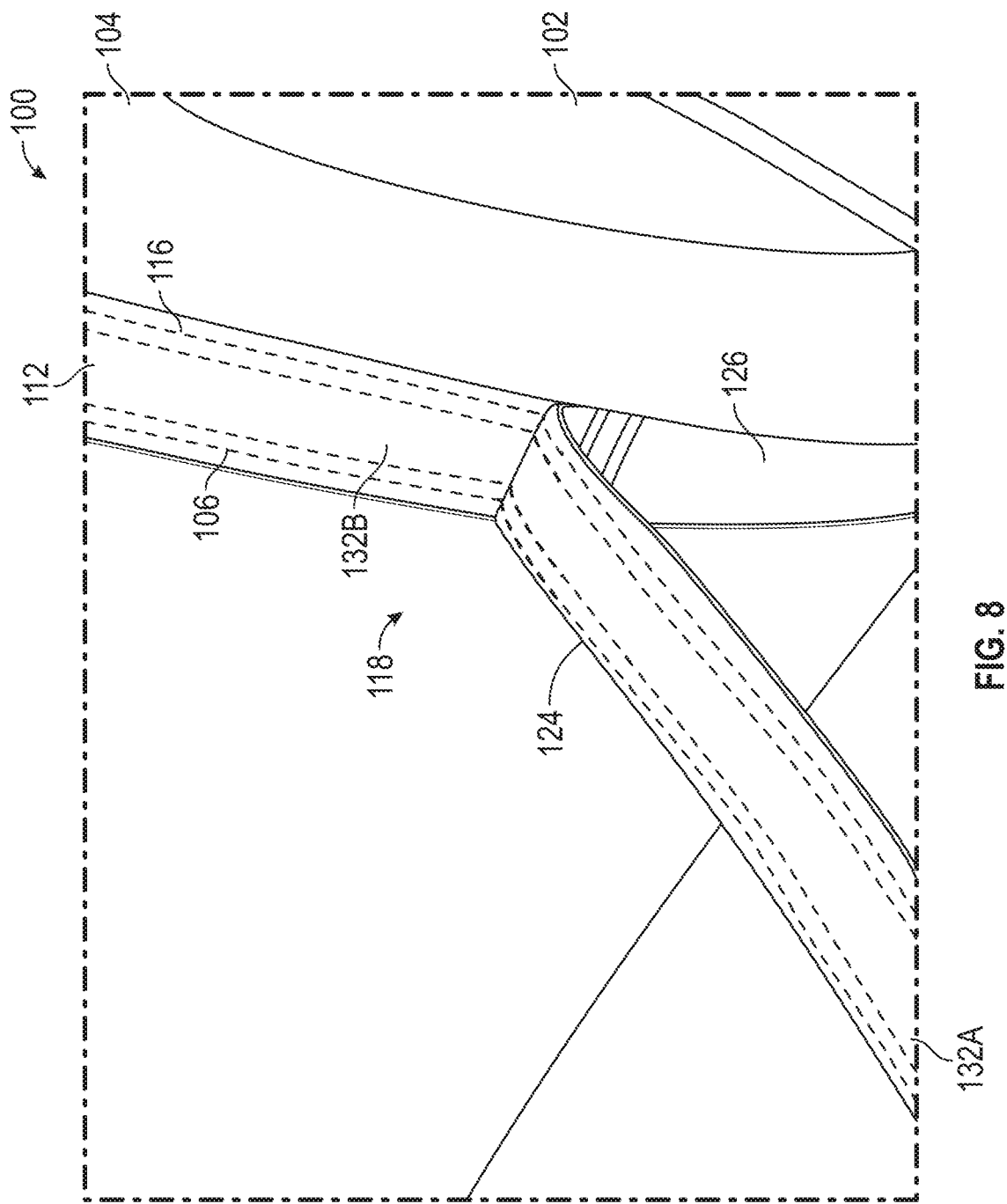
FIG. 8 is another photograph of the media holding band of FIG. 3 on a rotary drum of the system of FIG. 1.

FIGS. 7 and 8 illustrate the media holding band 106 holding the filtration media 104 on the rotary drum 102 that is covered by the filtration media 104. In some examples, the media holding band 106 is unconnected to the filtration media 104. In these examples, the media holding band 106 may be placed at various locations along the filtration media 104 as desired.

Figure 23:
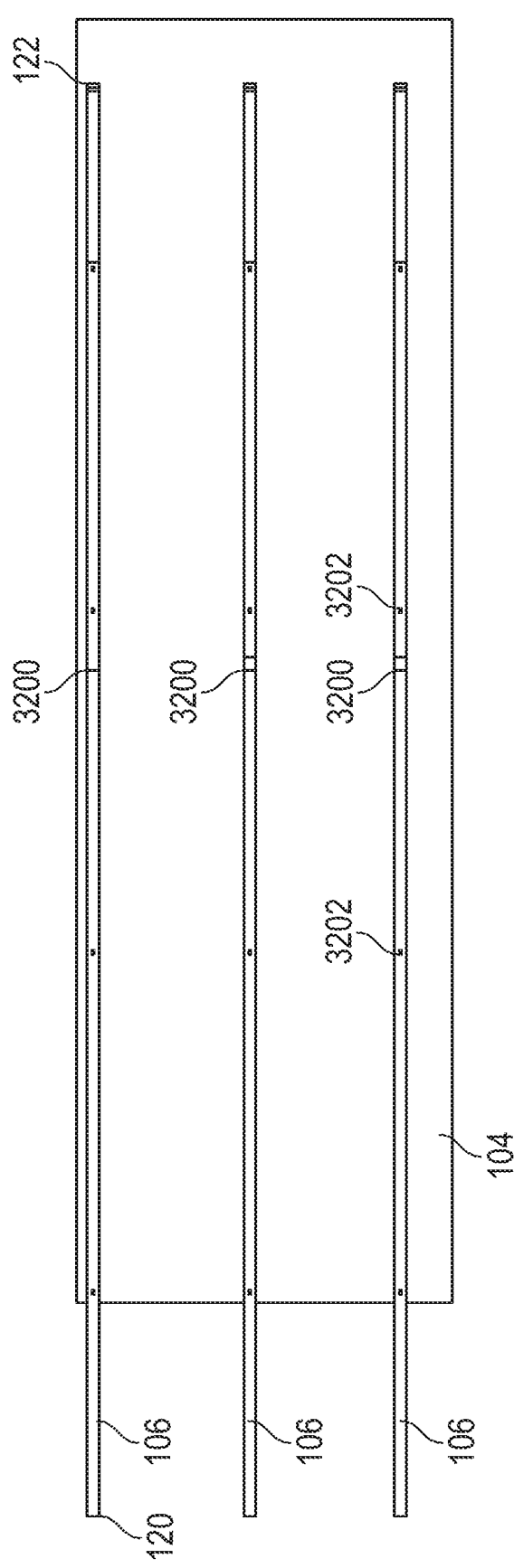
FIG. 23 is a top view of another example of a media holding band according to aspects of the present disclosure.
Figure 24:
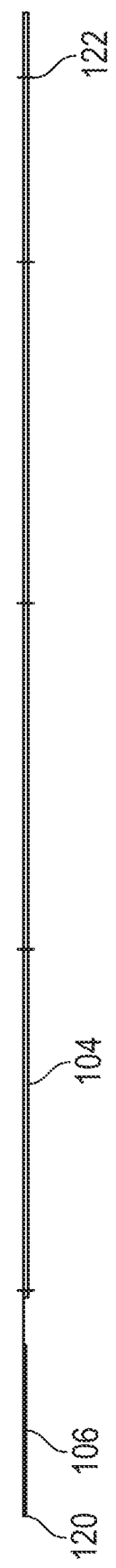
FIG. 24 is a side view of the media holding band of FIG. 23.

In other examples, the media holding band 106 is connected to the filtration media 104 through sewing, adhesives, bonding agents, or various other suitable attachment mechanisms (see, e.g., FIGS. 23 and 24). In these examples, the media holding band 106 is pre-positioned relative to the filtration media 104. In some examples, the media holding band 106 is connected to the filtration media 104 in at least one discrete location along the strap 116 between the first end 120 and the second end 122. In other examples, the media holding band 106 is connected to the filtration media 104 along a length of the strap 116. The media holding band 106 may be connected to an outer surface of the filtration media 104, although it need not be. For example, in other cases, the media holding band 106 may be connected to an inner surface of the filtration media 104 (see, e.g., FIGS. 25 and 26). In these examples, a portion of the media holding band 106 may be beneath the filtration media 104, such as between the filtration media 104 and the rotary drum 102.

Referring to FIGS. 9-12, a band installer 1100 for tensioning the media holding band 106 during installation of the media holding band 106 is illustrated. The band installer 1100 includes a body 1102 having a first end 1104 and a second end 1106 opposite the first end 1104. A gripping material 1108 is optionally provided along at least a portion of the outer surface 1110 of the body 1102. In some cases, the gripping material 1108 may be omitted from the band installer 1100. In various examples with the gripping material 1108, the gripping material 1108 may be a separate component secured onto the body 1102 (e.g., through adhesives, mechanical fasteners, glues, bonding agents, or other suitable securing mechanisms) or may be integrally formed with the body 1102 (e.g., through molding or other suitable forming processes).

Figure 9:
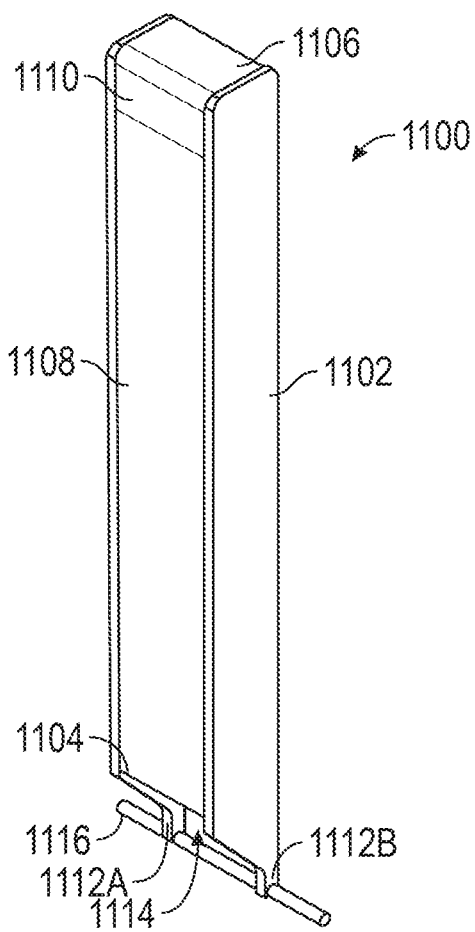
FIG. 9 is a perspective view of a tool for installing a media holding band on a rotary drum of the system of FIG. 1 according to aspects of the present disclosure.
Figure 10:
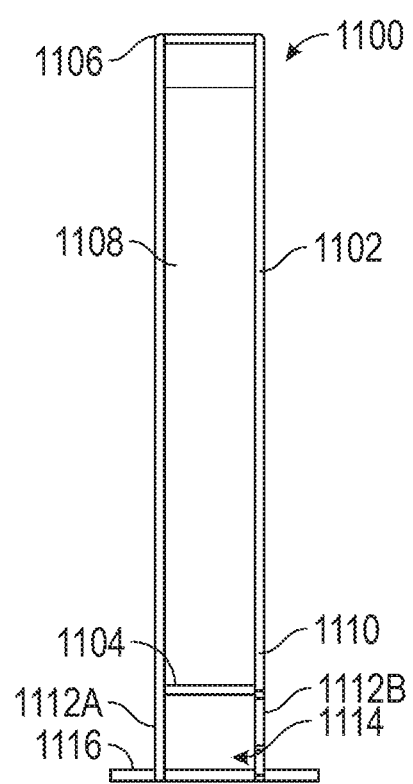
FIG. 10 is a front view of the tool of FIG. 9.
Figure 11:
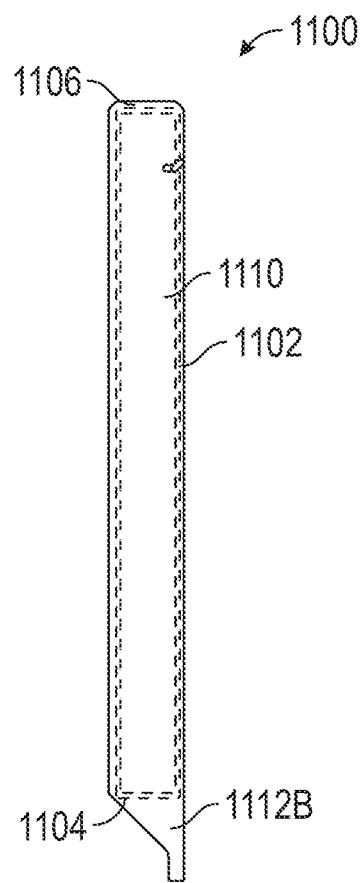
FIG. 11 is a side view of the tool of FIG. 9.
Figure 12:
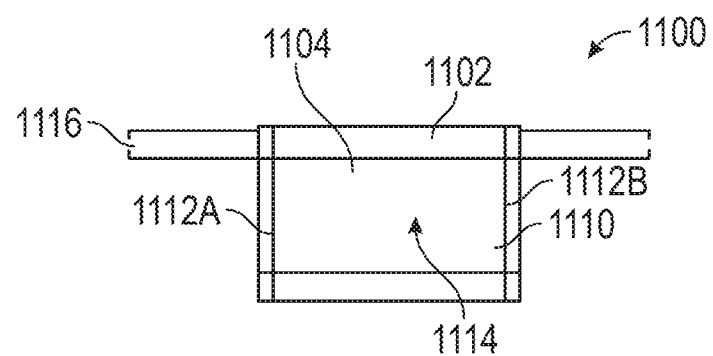
FIG. 12 is a bottom view of the tool of FIG. 9.

Support tabs 1112A and 1112B extend away from the first end of the body 1102. In various examples, the support tabs 1112A and 1112B are substantially parallel. As illustrated in FIGS. 9-11, a strap-receiving area 1114 is defined between the support tabs 1112A and 1112B. In various examples, the support tabs 1112A and 1112B are constructed from a material that does not deform during tensioning of the media holding band 106. For example, the support tabs 1112A and 1112B may be constructed from various materials including, but not limited to, steel, plastic, fiberglass, wood, or various other suitable materials. In some examples, the support tabs 1112A and 1112B are integrally formed with the body 1102. In other examples, the support tabs 1112A and 1112B are separate components that may be secured or attached to the body 1102 as needed. As one non-limiting example, the support tabs 1112A and 1112B may be steel inserts that are molded with a plastic body 1102 through injection molding. As illustrated in FIGS. 9 and 11, the support tabs 1112A and 1112B have an angled profile such that the support tabs 1112A and 1112B do not damage the filtration media 104 during installation. In various examples, the profile of the support tabs 1112A and 1112B may be various suitable profiles for reducing potential damage to the filtration media 104 and for allowing a suitable amount of rotation of the band installer 1100 about the securing pin 1116 to apply suitable tension to the media holding band 106. Each support tab 1112A and 1112B defines an opening configured to receive the securing pin 1116, which holds one of the ends of the strap 116 during installation, as described in detail below. The securing pin 1116 is removable from the support tabs 1112A and 1112B.

Referring to FIGS. 17-22, a method of installing the media holding band 106 on the rotary drum 102 is illustrated. The method includes positioning the filtration media on the rotary drum 102 and contacting the media holding band 106 with the filtration media 104. In some examples, contacting the media holding band 106 with the filtration media 104 includes positioning the media holding band 106 if it is not pre-positioned. For example, positioning the media holding band 106 can include wrapping the media holding band 106 around the drum (see, e.g., FIG. 17). Contacting the media holding band 106 with the filtration media 104 further includes positioning the media holding band 106 such that the first surface 124 faces the outer surface of the filtration media 104.

The method also includes securing the first end 120 relative to the second end 122 with the connector 118. In some examples where the connector 118 is the hook and loop connector, securing the first end 120 includes engaging the first engagement portion 132A with the second engagement portion 132B. Securing the first end 120 also includes tensioning the strap 116 against the filtration media 104. In some examples, tensioning the strap 116 includes at least partially compressing the filtration media 104 and bringing the first end 120 towards the second end 122.

In various examples, tensioning the strap 116 includes tensioning the strap 116 with the band installer 1100. In these examples, the attachment loop 128 at the second end 122 is aligned with the openings of the support tabs 1112A and 1112B, and the securing pin 1116 is inserted through the aligned attachment loop 128 and openings (see, e.g., FIG. 18). The first end 120 of the strap 116 is pulled through the strap-receiving area 1114 and folded back against the body 1102 such that the second surface 126 is facing the body 1102 and the first surface 124 with the first engagement portion 132A is facing away from the body 1102 (see, e.g., FIG. 19). At this stage, both the first engagement portion 132A and the second engagement portion 132B are facing away from the filtration media 104 (see, e.g., FIG. 19). The strap 116 is then tensioned by rotating the band installer 1100 to bring the first engagement portion 132A towards the second engagement portion 132B such that the portions become engaged. In some examples, during rotation, the securing pin 1116 may temporarily engage the filtration media 104 as rotation occurs about the securing pin 1116 the band installer 1100. In this step, rotating the band installer 1100 may include the user lifting up on the band installer 1100 and pivoting around the securing pin 116 (see, e.g., FIG. 20). The user continues to pivot the band installer 1100 until the first engagement portion 132A (e.g., hook portion) makes contact with the second engagement portion 132B (e.g., loop portion) (see, e.g., FIG. 21). The first end 120 of the strap 116 is lifted from the band installer 1100 and is held firmly by the user, and then the first engagement portion 132A is mated with the second engagement portion (see, e.g., FIG. 22). After the mating of the first engagement portion 132A with the second engagement portion 132B, the securing pin 1116 is removed (see, e.g., FIG. 22), and the band installer 1100 is then removed (see, e.g., FIG. 22).

Figure 13:
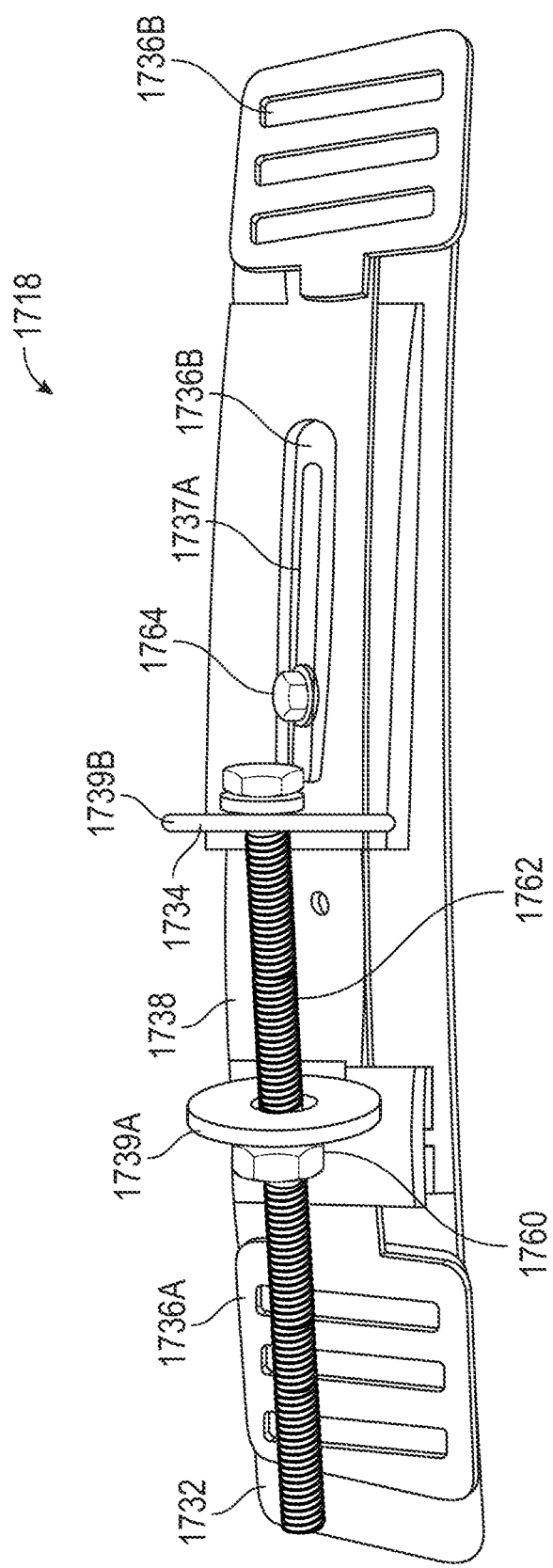
FIG. 13 is a photograph of a connector of a media holding band for the system of FIG. 1 according to aspects of the present disclosure.
Figure 14:
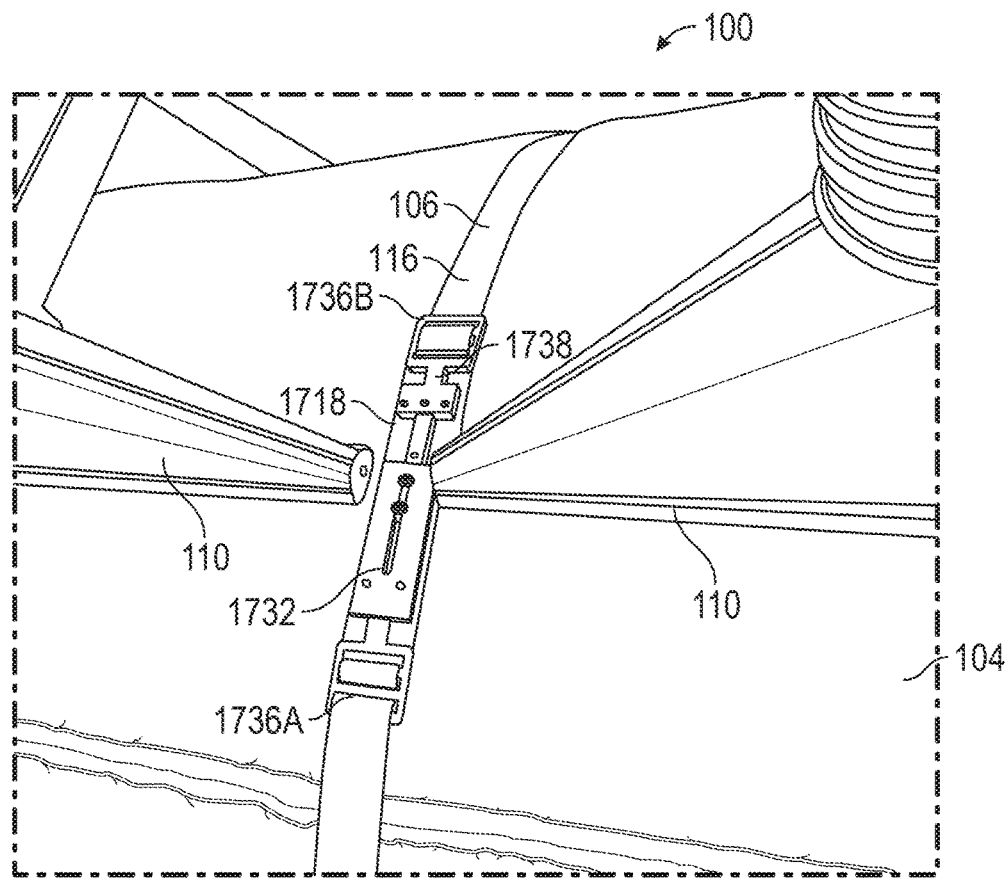
FIG. 14 is a photograph of a media holding band with the connector of FIG. 13 on a rotary drum of the system of FIG. 1.
Figure 15:
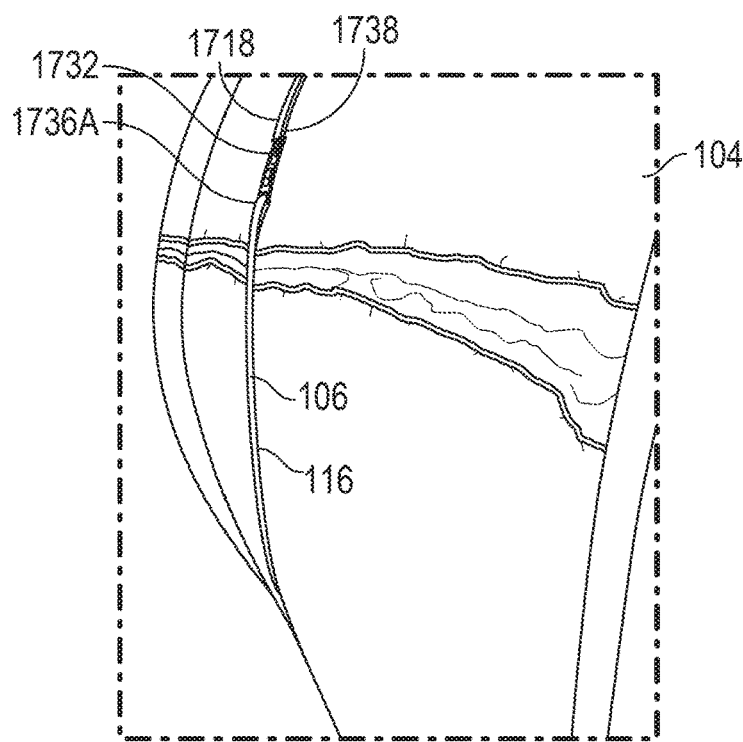
FIG. 15 is another photograph of a media holding band with the connector of FIG. 13 on a rotary drum of the system of FIG. 1.

FIGS. 13-15 illustrate another example of a connector 1718 that may be used with the strap 116 to form the media holding band 106. In this example, the connector 1718 is a metal connector that includes a strap holder 1732 and a tensioning mechanism 1734. The strap holder 1732 includes a first attachment portion 1736A that is configured to connect with the first end 120 of the strap 116 and a second attachment portion 1736B that is configured to connect with the second end 122 of the strap 116. The attachment portions 1736A and 1736B are slidable along a body 1738 through the tensioning mechanism 1734 to adjust the distance between the ends 120 and 122 of the strap 116. The first attachment portion 1736A includes a securing slot 1737A and the second attachment portion 1736B includes a securing slot 1737B that is aligned with the securing slot 1737A. A positioner 1764 is positionable within the aligned slots 1737A and 1737B and is configured to selectively restrict sliding of the first attachment portion 1736A and the second attachment portion 1736B.

Figure 16:
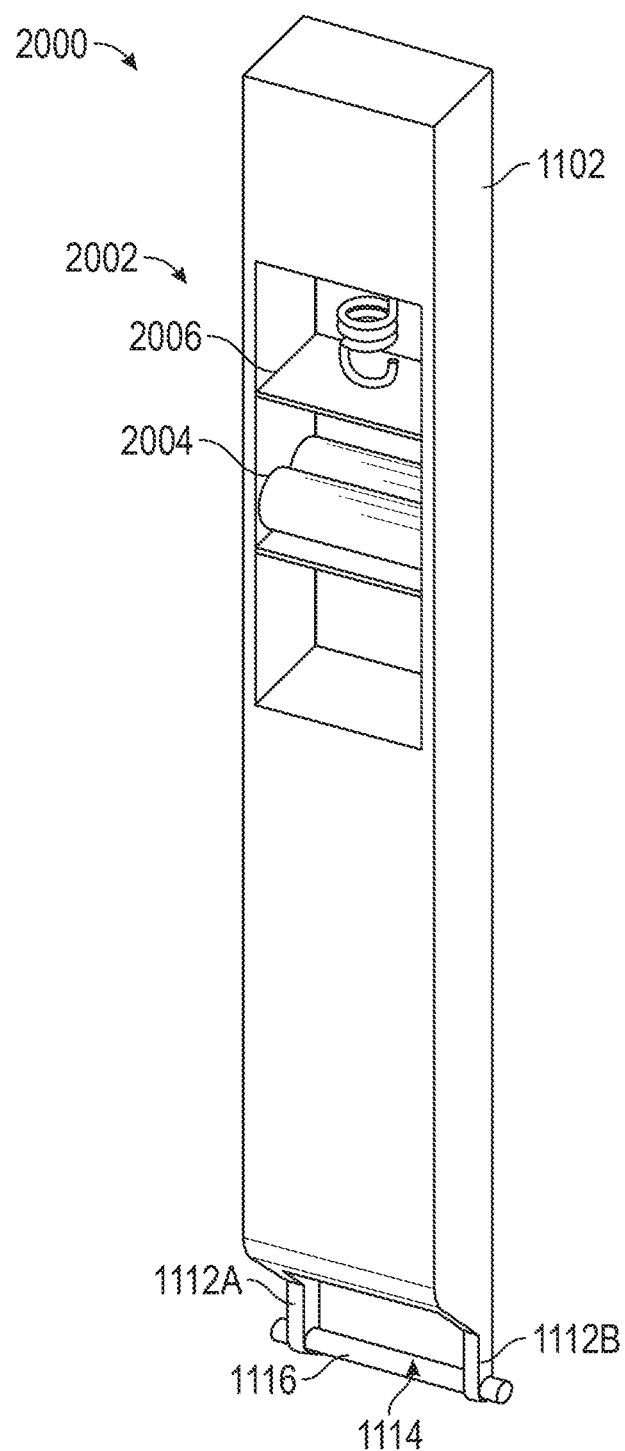
FIG. 16 is a sketch of another tool for installing a media holding band on a rotary drum of the system of FIG. 1 according to aspects of the present disclosure.
Figure 17:
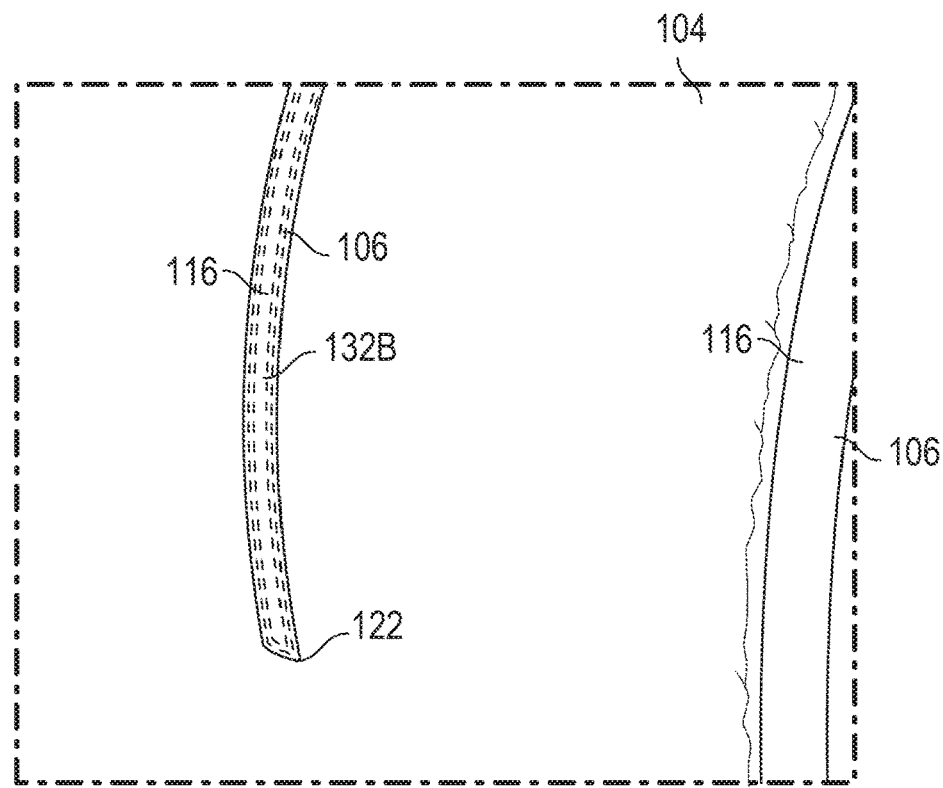
FIG. 17 illustrates a step of a method of installing the media holding band of FIG. 1 on a rotary drum.
Figure 18:
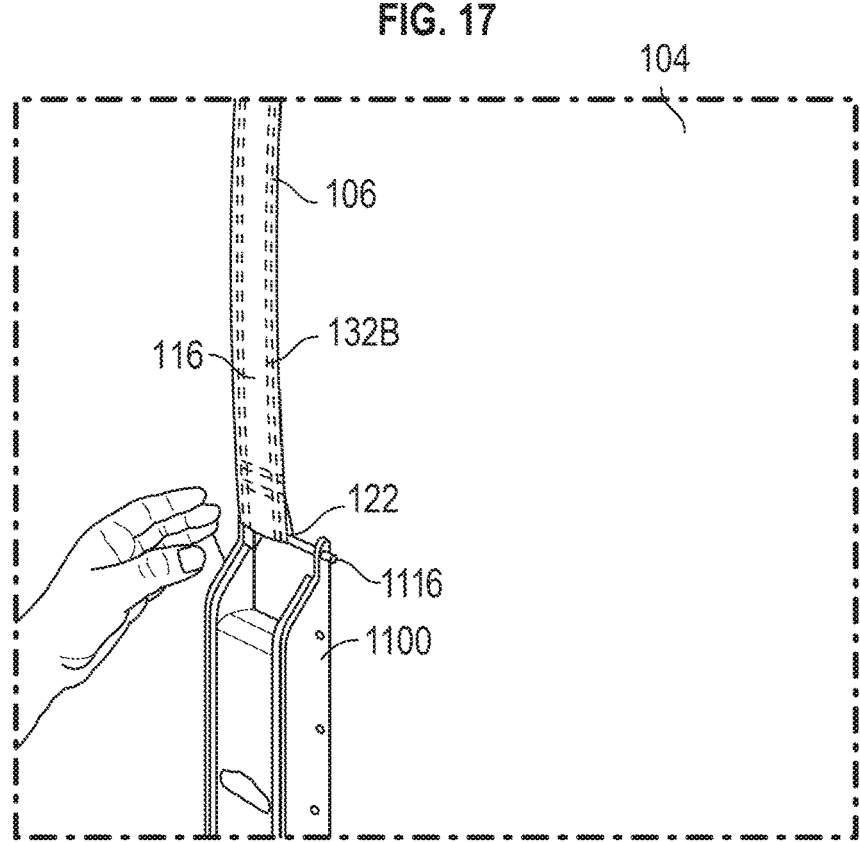
FIG. 18 illustrates another step of the method of installing the media holding band of FIG. 1 on a rotary drum.
Figure 19:
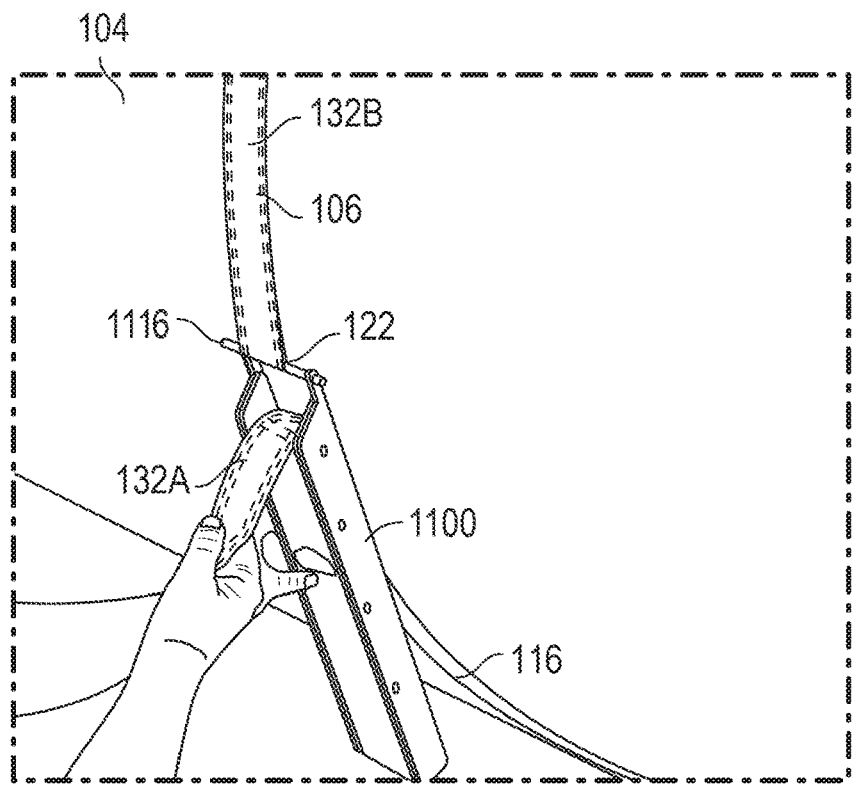
FIG. 19 illustrates another step of the method of installing the media holding band of FIG. 1 on a rotary drum.
Figure 20:
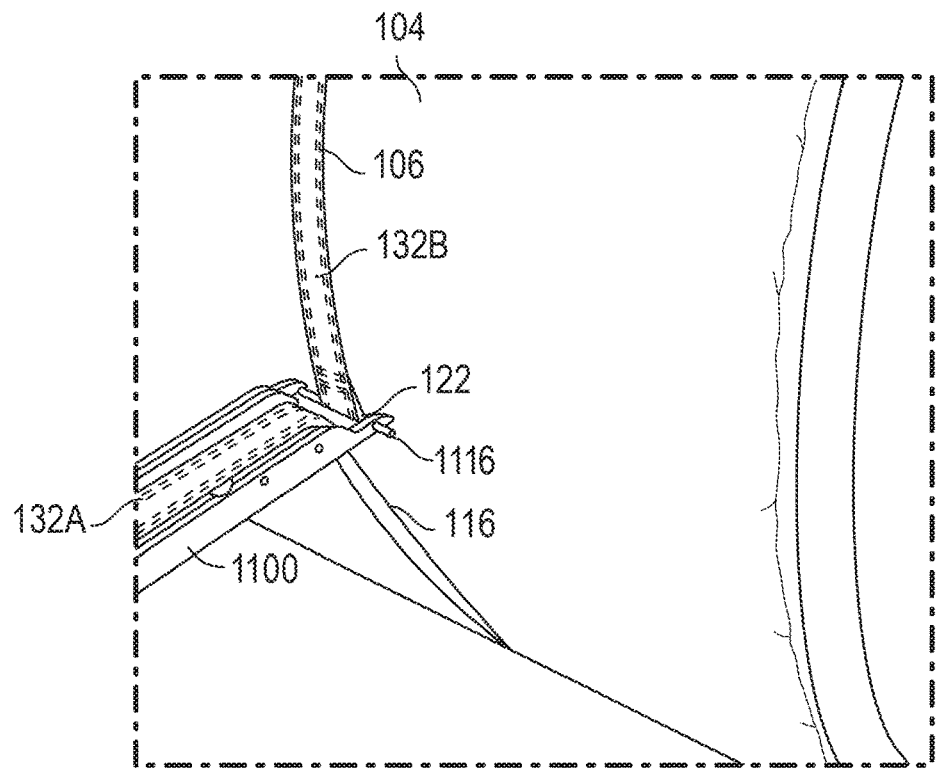
FIG. 20 illustrates another step of the method of installing the media holding band of FIG. 1 on a rotary drum.
Figure 21:
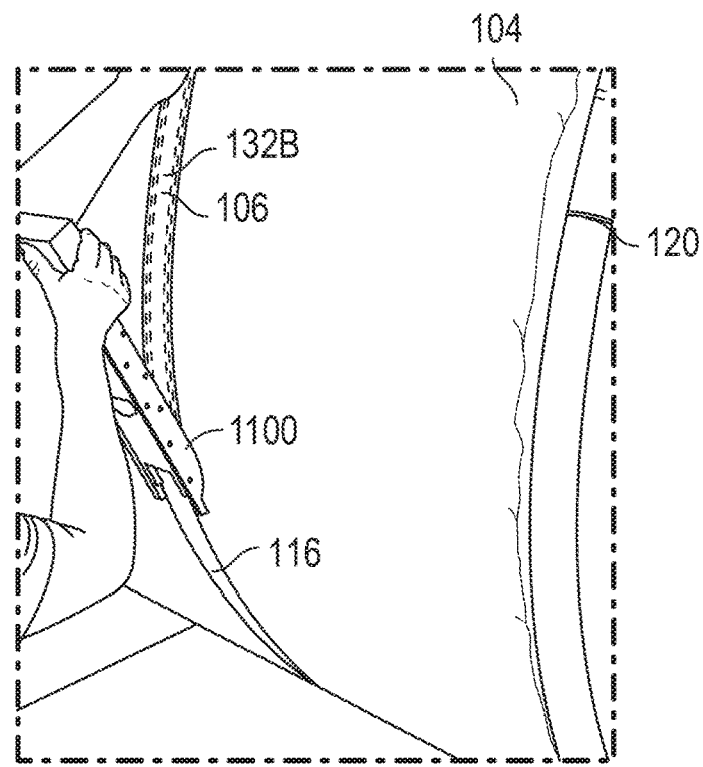
FIG. 21 illustrates another step of the method of installing the media holding band of FIG. 1 on a rotary drum.
Figure 22:
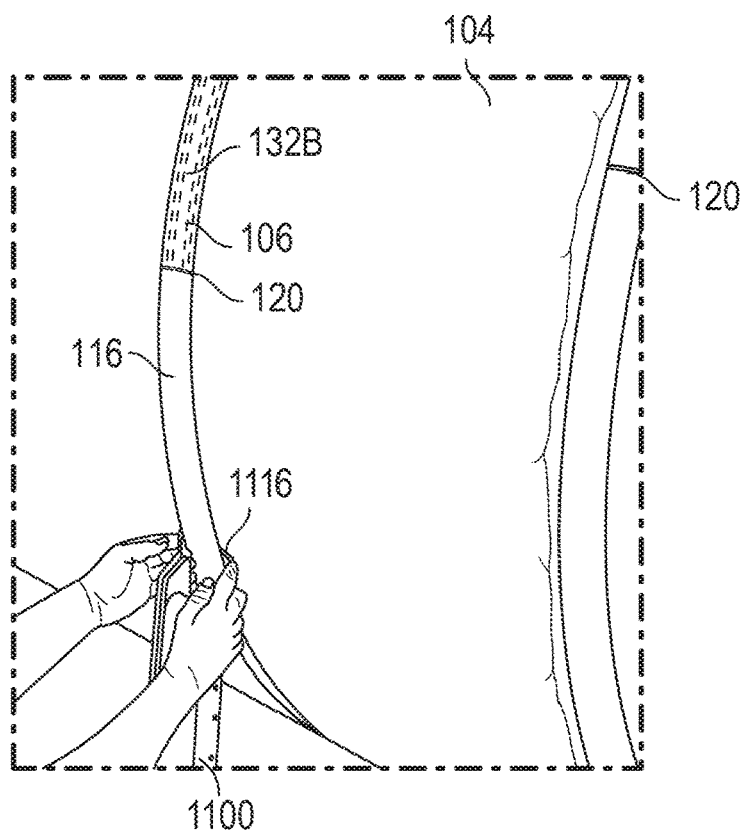
FIG. 22 illustrates another step of the method of installing the media holding band of FIG. 1 on a rotary drum.

In various examples, the tensioning mechanism 1734 includes two tab portions 1739A and 1739B detachably connected to the attachment portions 1736A and 1736B, respectively. A nut 1760 and bolt 1762, or other similar mechanisms, are configured to selectively adjust the distance between the attachment portions 1736A and 1736B, which selectively adjusts the distance between the ends 120 and 122 of the strap 116. When the attachment portions 1736A and 1736B are at their desired positions, a positioner 1764 that maintains the positions of the attachment portions 1736A and 1736B is secured, and the tensioning mechanism 1734 is removed. FIGS. 14 and 16 illustrate the connector 1718 with the strap 116, and the tensioning mechanism 1734 removed.

FIG. 16 illustrates another example of a band installer 2000. The band installer 2000 is substantially similar to the band installer 1100 except that the band installer 2000 includes a tension system 2002 to control a tension of the media holding band 106. The tension system 2002 includes a gripper 2004 and a tensioner 2006. In some cases, the tensioner 2006 is adjustable. For example, the tensioner 2006 may be spring-loaded or otherwise adjustable. In use, the end of the media holding band 106 that is not connected to the securing pin 1116 is fed through the strap-receiving area 1114 and then between the gripper 2004 and the tensioner 2006. The tensioner 2006 is then adjusted to control an amount of force holding the media holding band 106 on the band installer 2000, and thus the tension of the media holding band 106 as the media holding band 106 is installed.

FIGS. 23 and 24 illustrate an example of the media holding band 106 connected to the filtration media 104 in at least one location 3200 such that the media holding band 106 is pre-positioned relative to the filtration media 104. As illustrated in FIG. 23, in some examples, temporary positioners 3202 (such as fabric tags or various other suitable temporary positioners) may be provided at various locations along the media holding band 106 to temporarily maintain the position of the media holding band 106 relative to the filtration media 104 until the media holding band 106 is tensioned. The number, size, type, or location of the temporary positioners 3202 should not be considered limiting on the current disclosure. After the media holding band 106 is tensioned, the temporary positioners 3202 may be removed.

Figure 25:
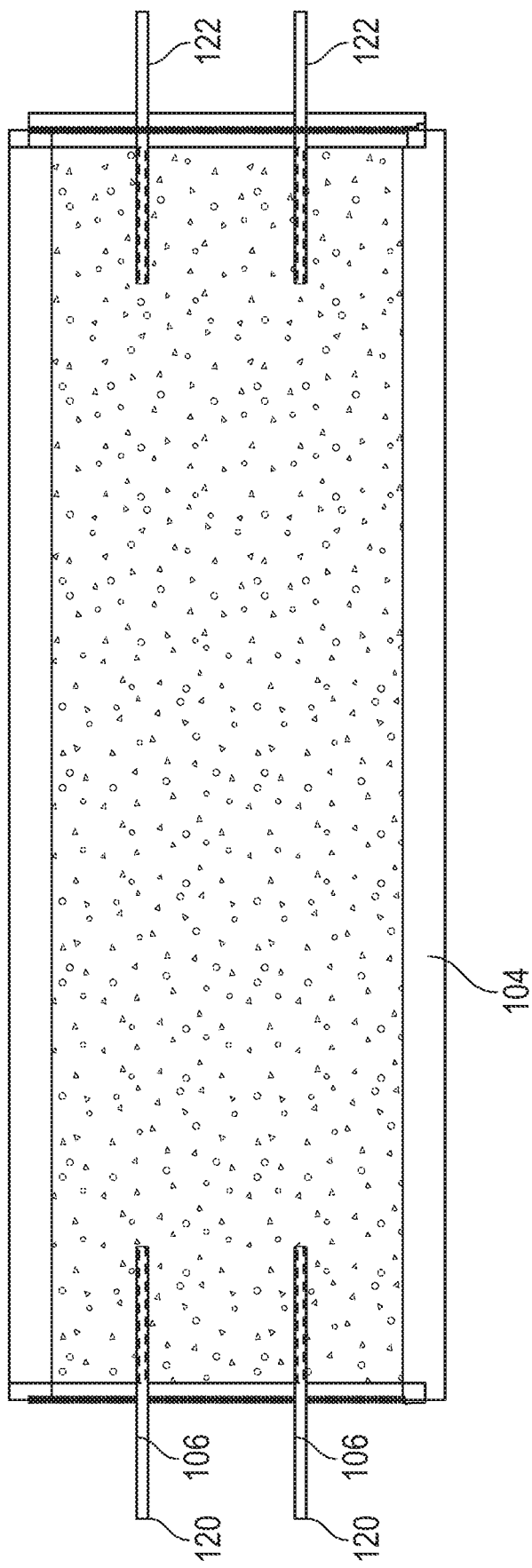
FIG. 25 is a top view of another example of a media holding band according to aspects of the present disclosure.
Figure 26:
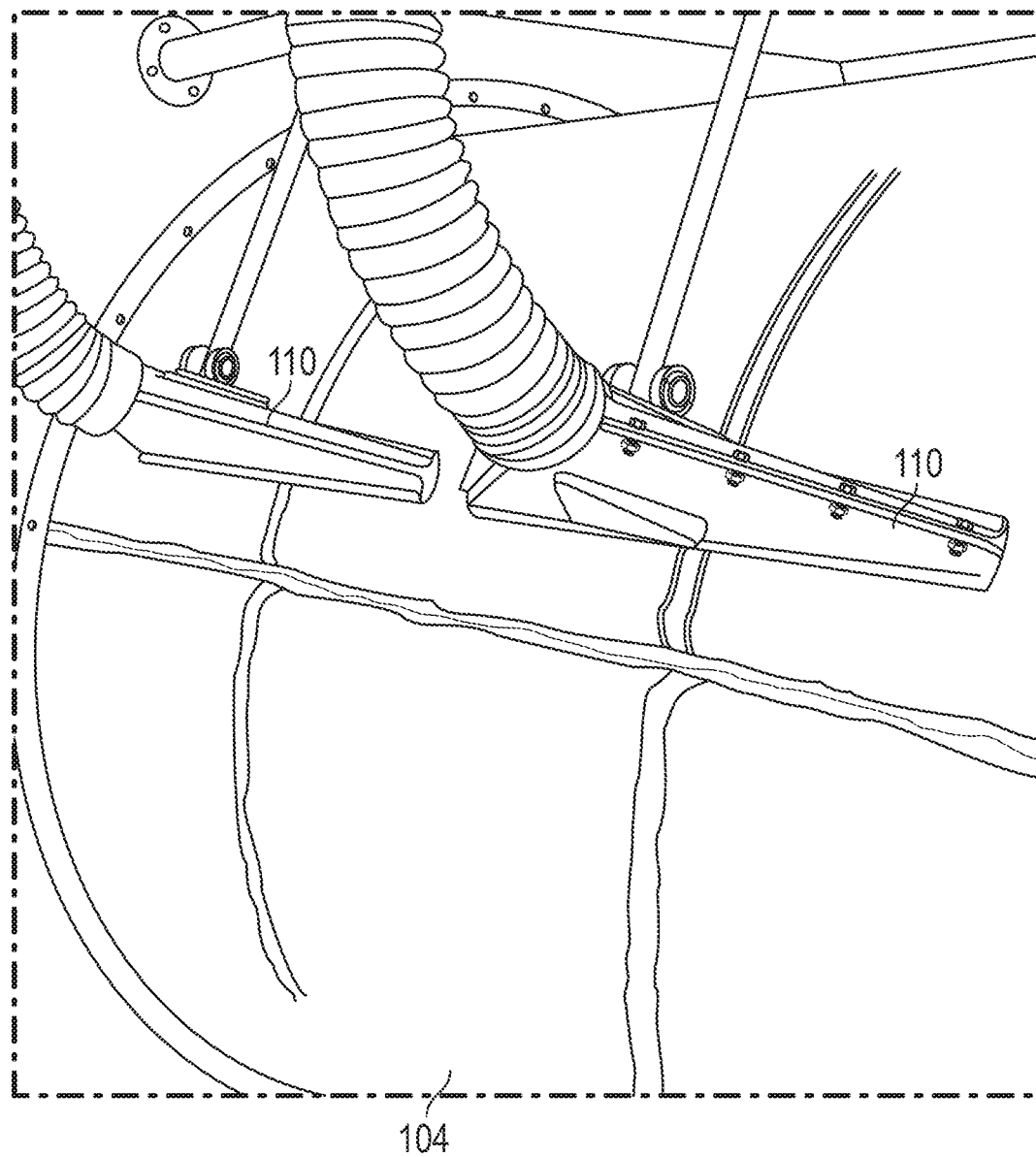
FIG. 26 is a picture of a drum filtration system having the media holding band of FIG. 25.

FIGS. 25 and 26 illustrate an example of the media holding band connected to an inner surface of the filtration media 104 such that when installed, at least a portion of the media holding band 106 is between the filtration media 104 and the rotary drum 102. As illustrated in FIG. 25, in some examples, each media holding band 106 is discontinuous such that when the media holding band 106 is installed, it does not go all the way around the rotary drum 102. In some examples, the discontinuous media holding band 106 may maintain a flexibility of the filtration media 104 such that the filtration media 104 may be tensioned and secured on the rotary drum 102. As illustrated in FIG. 26, when the filtration media 104 is installed on the rotary drum 102, at least a portion of the media holding band 106 is not visible. In some examples, the entire media holding band 106 is optionally not visible. For example, in some of these examples, the overlapped portions of the media holding band 106 may be tucked underneath or below the filtration media 104.

Figure 27:
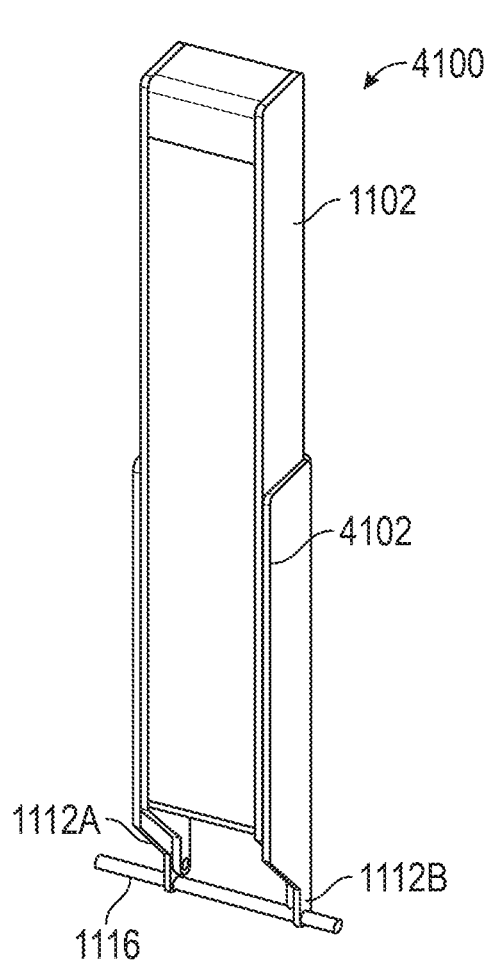
FIG. 27 is a perspective view of another band installer according to aspects of the present disclosure.
Figure 28:
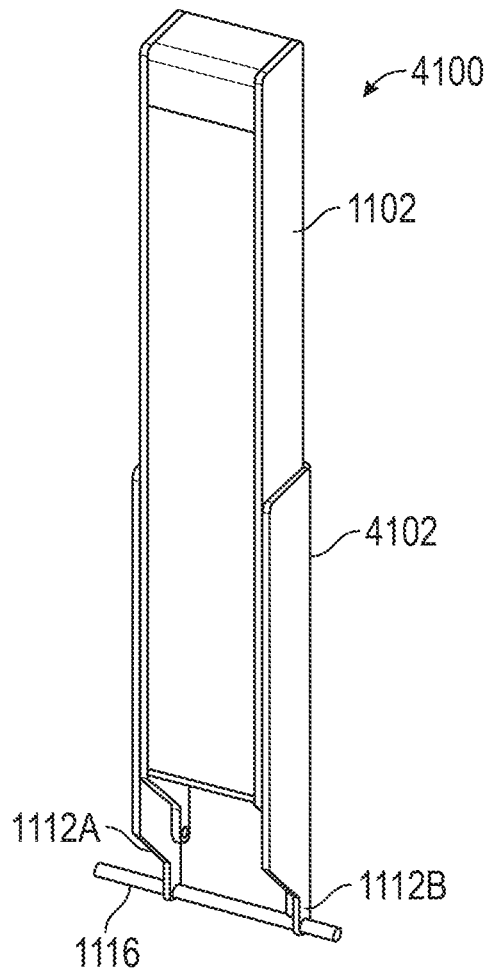
FIG. 28 is another perspective view of the band installer of FIG. 27.

FIGS. 27 and 28 illustrate another example of a band installer 4100. The band installer 4100 is substantially similar to the band installer 1100 except that the band installer 4100 includes a sleeve 4102 having the support tabs 1112A and 1112B. The sleeve 4102 is movable along the body 1102 to various positions (see, e.g., FIGS. 27 and 28). In various examples, the sleeve 4102 is secured at a desired position on the body 1102 through various securing mechanisms including, but not limited to, nuts and bolts, spring pins, pins, or other suitable securing mechanisms. In such cases, a plurality of securing bores are provided along at least one side of the body 1102 that the securing mechanism can engage. By adjusting a position of the sleeve 4102 relative to the body 1102, the support pin 1116 may be positioned at a desired location relative to the body 1102. For example, in some cases, one factor that determines final tension applied to the media band during installation is distance between support pin 1116 and band installer end 1104. In some cases, the band installer could be fabricated with a fixed distance (e.g., band installer 1100 of FIG. 9) for an application or with an adjustable distance for a range of applications (e.g., band installers 4100 of FIG. 27).

Figure 30:
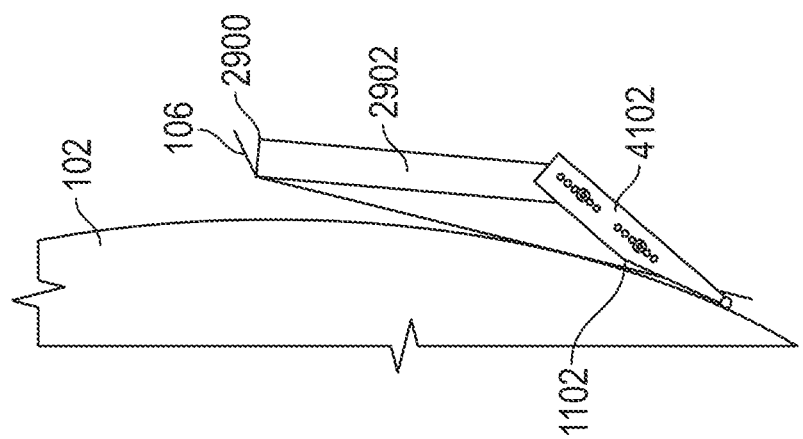
FIG. 30 is a side view of the band installer of FIG. 29 installing the media holding band of FIG. 1 on the rotary drum.
Figure 29:
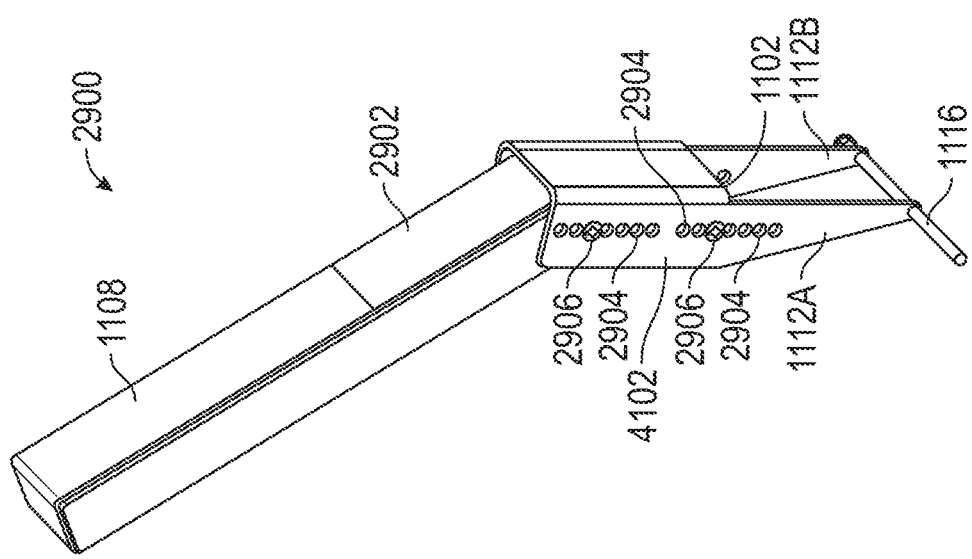
FIG. 29 is a perspective view of another band installer according to aspects of the present disclosure.

FIGS. 29 and 30 illustrate another example of a band installer 2900. The band installer 2900 is substantially similar to the band installer 4100 except that the body 1102 includes an angled portion 2902 that extends along a plane that is non-parallel with a plane of the remainder of the body. In certain examples, the angled portion 2902 may allow for a larger initial contact and/or engagement area for the hook and loop material. As illustrated in FIG. 30, in some examples, a portion of the media holding band 106 may be spaced apart from the band installer 2900 when the media holding band 106 is engaged with the gripping material 1108.

As illustrated in FIG. 29, the sleeve 4102 of the band installer 2900 includes a plurality of positioning apertures 2904 and at least one positioning pin 2906 for securing the sleeve 4102 at a position along the band installer 4100. The number of positioning apertures 2904 and positioning pins 2906 should not be considered limiting on the current disclosure. In various examples, various other suitable positioning mechanisms may be used to secure a position of the sleeve 4102 relative to the body 1102.

Figure 32:
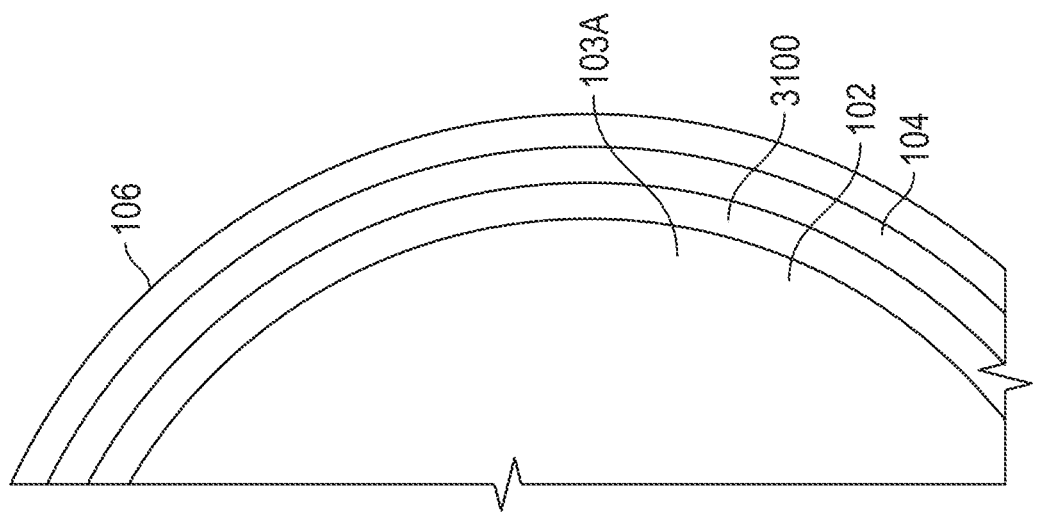
FIG. 32 is a side view of the rotary drum and supplementary media holder of FIG. 31 with filter media and a media holding band.
Figure 31:
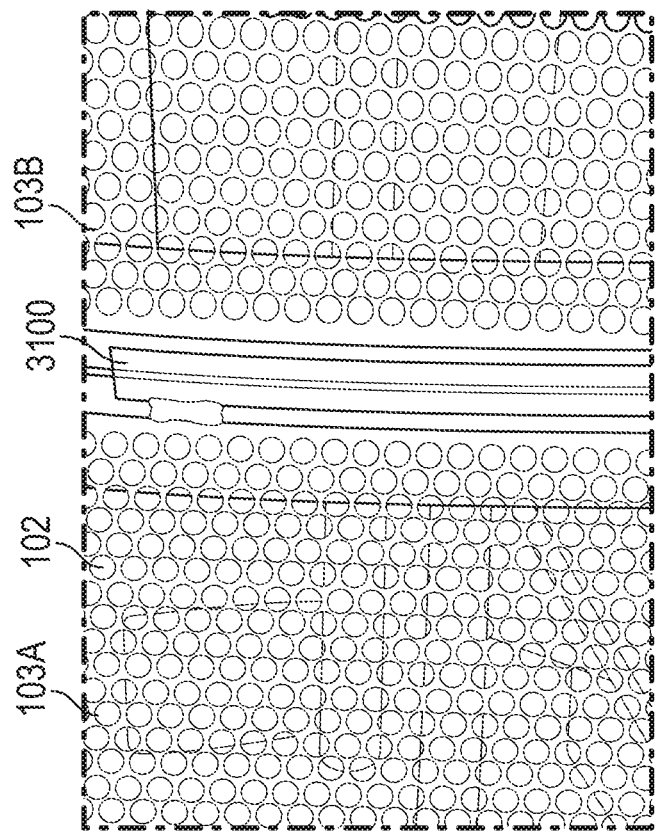
FIG. 31 is a perspective view of a supplementary media holder on a rotary drum according to aspects of the present disclosure.

FIGS. 31 and 32 illustrate an example of a supplementary media holder 3100. In certain examples, the supplementary media holder 3100 may be utilized to provide more holding power to keep the filtration media 104 in place on the rotary drum 102. In certain examples, the supplementary media holder 3100 may decrease the amount of tension needed to be applied by the media holding bands 106. As illustrated in FIG. 31, the supplementary media holder 3100 may optionally be placed on the rotary drum 102. In one non-limiting example, the supplementary media holder 3100 is installed where two sections (e.g., sections 103A-B) of the rotary drum 102 are joined, although other locations on the rotary drum 102 may be utilized. In certain cases, the supplementary media holder 3100 is optionally installed before the filtration media 104 is installed.

In various examples, the supplementary media holder 3100 includes friction tape, although various other suitable supplementary media holder mechanisms may be utilized. In various examples, the supplementary media holder 3100 extends around a circumference of the rotary drum 102, although it need not. In various aspects, the supplementary media holder 3100 may be sized and dimensioned such that the supplementary media holder 3100 does not impeded the installation of the filtration media 104.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A drum filtration system comprising: a rotary drum; a filtration media configured to filter a process air pulled through the filtration media and the rotary drum; and a media holding band holding the filtration media on the rotary drum and comprising: a strap having a first end and a second end opposite the first end; and a connector configured to secure the first end of the strap relative to the second end of the strap.

EC 2. The drum filtration system of any of the preceding or subsequent example combinations, further comprising: a filter enclosure; at least one suction nozzle; and a fan, wherein the rotary drum is rotatable within the filter enclosure, wherein the at least one suction nozzle is configured to remove particulates that accumulate on the filtration media, and wherein the fan is configured to pull process air through the filtration media and through the rotary drum to produce filtered air.

EC 3. The drum filtration system of any of the preceding or subsequent example combinations, wherein the rotary drum is hollow and configured to allow air to be pulled through the rotary drum, wherein a first end of the rotary drum is closed, and wherein a second end of the rotary drum is open.

EC 4. The drum filtration system of any of the preceding or subsequent example combinations, wherein a diameter of the rotary drum is from about 4 feet to about 10 feet.

EC 5. The drum filtration system of any of the preceding or subsequent example combinations, wherein the filtration media comprises a knit material with polyester fibers.

EC 6. The drum filtration system of any of the preceding or subsequent example combinations, wherein the filtration media comprises a filtration media height.

EC 7. The drum filtration system of any of the preceding or subsequent example combinations, wherein the connector comprises a connector height, and wherein the connector height is less than 50% of the filtration media height.

EC 8. The drum filtration system of any of the preceding or subsequent example combinations, wherein at least one of the first end and the second end of the strap comprises an attachment loop.

EC 9. The drum filtration system of any of the preceding or subsequent example combinations, wherein the attachment loop is dimensioned to accommodate a securing pin.

EC 10. The drum filtration system of any of the preceding or subsequent example combinations, wherein the strap further comprises a first surface extending from the first end to the second end and a second surface opposite the first surface, wherein a distance from the first surface to the second surface is a strap height, and wherein the strap height is less than 25% of a height of the filtration media.

EC 11. The drum filtration system of any of the preceding or subsequent example combinations, wherein a distance from the first end to the second end of the strap is a strap length.

EC 12. The drum filtration system of any of the preceding or subsequent example combinations, wherein the strap comprises polymer webbing.

EC 13. The drum filtration system of any of the preceding or subsequent example combinations, wherein the connector is non-metallic.

EC 14. The drum filtration system of any of the preceding or subsequent example combinations, wherein the connector is a hook and loop connector comprising: a first portion proximate the first end and on a first surface of the strap that extends from the first end to the second end; and a second portion engageable with the first portion, the second portion proximate the second end and on a second surface of the strap that is opposite the first surface.

EC 15. The drum filtration system of any of the preceding or subsequent example combinations, wherein the first portion comprises hooks and the second portion comprises loops configured to engage the hooks.

EC 16. The drum filtration system of any of the preceding or subsequent example combinations, wherein the first portion comprises loops and the second portion comprises hooks configured to engage the loops.

EC 17. The drum filtration system of any of the preceding or subsequent example combinations, wherein the first portion comprises a first portion length, wherein the second portion comprises a second portion length, and wherein the first portion length and the second portion length are at least a minimum overlap length.

EC 18. The drum filtration system of any of the preceding or subsequent example combinations, wherein the first portion length and the second portion length are substantially the same.

EC 19. The drum filtration system of any of the preceding or subsequent example combinations, wherein the minimum overlap length is about 30 inches.

EC 20. The drum filtration system of any of the preceding or subsequent example combinations, wherein the minimum overlap length is about 24 inches.

EC 21. The drum filtration system of any of the preceding or subsequent example combinations, wherein the connector comprises: a strap holder comprising: a body; a first attachment portion configured to connect with the first end of the strap, wherein the first attachment portion is slidable along the body and comprises a first securing slot; a second attachment portion opposite the first attachment portion and configured to connect with the second end of the strap, wherein the second attachment portion is slidable along the body and comprises a second securing slot aligned with the first securing slot; and a positioner positionable within the aligned first securing slot and second securing slot, wherein the positioner is configured to selectively restrict sliding of the first attachment portion and the second attachment portion; and a tensioning mechanism configured to selectively adjust a distance between the first attachment portion and the second attachment portion, wherein the tensioning mechanism is detachable from the strap holder.

EC 22. The drum filtration system of any of the preceding or subsequent example combinations, wherein the connector is attached to the strap through sewing.

EC 23. The drum filtration system of any of the preceding or subsequent example combinations, wherein the connector is attached to the strap through a bonding agent or adhesive.

EC 24. The drum filtration system of any of the preceding or subsequent example combinations, wherein the media holding band is unconnected to the filtration media such that the media holding band is movable along an outer surface of the filtration media.

EC 25. The drum filtration system of any of the preceding or subsequent example combinations, wherein the media holding band is connected to the filtration media such that the media holding band is pre-positioned relative to the filtration media.

EC 26. The drum filtration system of any of the preceding or subsequent example combinations, wherein the media holding band is sewn to the filtration media in at least one location between the first end and the second end of the strap.

EC 27. The drum filtration system of any of the preceding or subsequent example combinations, wherein the media holding band is sewn along a length of the strap to the filtration media from proximate the first end to proximate the second end of the strap.

EC 28. The drum filtration system of any of the preceding or subsequent example combinations, wherein the media holding band is connected to an outer surface of the filtration media.

EC 29. The drum filtration system of any of the preceding or subsequent example combinations, wherein the media holding band is connected to an inner surface of the filtration media.

EC 30. The drum filtration system of any of the preceding or subsequent example combinations, wherein the media holding band is connected to the filtration media through a bonding agent or adhesive.

EC 31. The drum filtration system of any of the preceding or subsequent example combinations, further comprising a band installer configured to tension the media holding band during installation such that the media holding band holds the filtration media relative to the rotary drum, wherein the band installer comprises: a body comprising a first end, a second end opposite the first end, and a gripping material on at least part of an outer surface of the body at the second end; two support tabs at the first end of the body and extending substantially parallel outward from the body, wherein the support tabs define a strap-receiving area between the support tabs; and a securing pin removably connected to the two support tabs, wherein the securing pin is configured to engage the first end or the second end of the strap.

EC 32. The drum filtration system of any of the preceding or subsequent example combinations, wherein the support tabs comprise steel.

EC 33. A method of installing filtration media on a rotary drum of a drum filtration system, the method comprising: positioning the filtration media on the rotary drum; contacting a strap of a media holding band with the filtration media around a diameter of the rotary drum; and holding the filtration media on the rotary drum by securing a first end of the strap of the media holding band relative to a second end of the strap of the media holding band with a connector of the media holding band.

EC 34. The method of any of the preceding or subsequent example combinations, wherein the connector is non-metallic.

EC 35. The method of any of the preceding or subsequent example combinations, wherein the filtration media comprises a filtration media height, wherein the connector comprises a connector height, and wherein the connector height is less than 50% of the filtration media height.

EC 36. The method of any of the preceding or subsequent example combinations, wherein the strap further comprises a first surface extending from the first end to the second end and a second surface opposite the first surface, wherein a distance from the first surface to the second surface is a strap height, and wherein the strap height is less than 25% of a height of the filtration media.

EC 37. The method of any of the preceding or subsequent example combinations, wherein the connector is a hook and loop connector comprising: a first portion proximate the first end and on a first surface of the strap that extends from the first end to the second end; and a second portion proximate the second end and on a second surface of the strap that is opposite the first surface, wherein securing the first end of the strap of the media holding band relative to the second end of the strap comprises engaging the first portion with the second portion.

EC 38. The method of any of the preceding or subsequent example combinations, wherein the strap is unconnected to the filtration media, and wherein contacting the strap with the filtration media comprises moving the strap along an outer surface of the filtration media and positioning the strap relative to the filtration media.

EC 39. The method of any of the preceding or subsequent example combinations, wherein securing the first end of the strap relative to a second end of the strap comprises tensioning the strap with a band installer against the filtration media.

EC 40. The method of any of the preceding or subsequent example combinations, wherein tensioning the strap with the band installer comprises: aligning an attachment loop at the second end of the strap with two support tabs on the band installer; inserting a securing pin through the aligned attachment loop and two support tabs; pulling the first end of the strap through a strap-receiving area defined by the two support tabs; frictionally engaging a portion of the strap proximate the first end with a gripping material on a body of the band installer; and pivoting the band installer such that the connector secures the first end of the strap relative to the second end of the strap.

EC 41. A filtration system comprising: a rotary drum; and a media holding band configured to hold a filtration media on an outer surface of the rotary drum, wherein the media holding band comprises: a strap having a first end and a second end opposite the first end; and a connector configured to secure the first end of the strap relative to the second end of the strap.

EC 42. The filtration system of any of the preceding or subsequent example combinations, further comprising: the filtration media; a filter enclosure; at least one suction nozzle; and a fan, wherein the rotary drum is rotatable within the filter enclosure, wherein the at least one suction nozzle is configured to remove particulates that accumulate on the filtration media, and wherein the fan is configured to pull process air through the filtration media and through the rotary drum to produce filtered air.

EC 43. The filtration system of any of the preceding or subsequent example combinations, wherein the rotary drum is hollow and configured to allow air to be pulled through the rotary drum, wherein a first end of the rotary drum is closed, and wherein a second end of the rotary drum is open.

EC 44. The filtration system of any of the preceding or subsequent example combinations, wherein at least one of the first end and the second end of the strap comprises an attachment loop.

EC 45. The filtration system of any of the preceding or subsequent example combinations, wherein the attachment loop is dimensioned to accommodate a securing pin.

EC 46. The filtration system of any of the preceding or subsequent example combinations, wherein a distance from the first end to the second end of the strap is a strap length.

EC 47. The filtration system of any of the preceding or subsequent example combinations, wherein the strap length is adjustable.

EC 48. The filtration system of any of the preceding or subsequent example combinations, wherein the strap length is configured to accommodate at least two different rotary drum diameters.

EC 49. The filtration system of any of the preceding or subsequent example combinations, wherein the connector is non-metallic.

EC 50. The filtration system of any of the preceding or subsequent example combinations, wherein the connector is a hook and loop connector comprising: a first engagement portion proximate the first end and on a first surface of the strap that extends from the first end to the second end; and a second engagement portion engageable with the first engagement portion, the second engagement portion proximate the second end and on a second surface of the strap that is opposite the first surface.

EC 51. The filtration system of any of the preceding or subsequent example combinations, wherein the first engagement portion comprises a first portion length, wherein the second engagement portion comprises a second portion length, and wherein the first portion length and the second portion length are at least a minimum overlap length.

EC 52. The drum filtration system of any of the preceding or subsequent example combinations, wherein the connector is attached to the strap through sewing.

EC 53. The drum filtration system of any of the preceding or subsequent example combinations, wherein the connector is attached to the strap through a bonding agent or adhesive.

EC 54. A drum filtration system comprising: a rotary drum; and a media holding band configured to hold a filtration media on an outer surface of the rotary drum, wherein the media holding band comprises: a strap having a first end and a second end opposite the first end; and a connector configured to secure the first end of the strap relative to the second end of the strap.

EC 55. The drum filtration system of any of the preceding or subsequent example combinations, further comprising the filtration media, wherein the filtration media is configured to filter a process air pulled through the filtration media and the rotary drum.

EC 56. The drum filtration system of any of the preceding or subsequent example combinations, further comprising: a filter enclosure; at least one suction nozzle; and a fan, wherein the rotary drum is rotatable within the filter enclosure, wherein the at least one suction nozzle is configured to remove particulates that accumulate on the filtration media, and wherein the fan is configured to pull process air through the filtration media and through the rotary drum to produce filtered air.

EC 57. The drum filtration system of any of the preceding or subsequent example combinations, wherein the filtration media comprises a filtration media height, wherein the connector comprises a connector height, and wherein the connector height is less than 50% of the filtration media height.

EC 58. The drum filtration system of any of the preceding or subsequent example combinations, wherein the strap further comprises a first surface extending from the first end to the second end and a second surface opposite the first surface, wherein a distance from the first surface to the second surface is a strap height, and wherein the strap height is less than 25% of a height of the filtration media.

EC 59. The drum filtration system of any of the preceding or subsequent example combinations, wherein the media holding band is unconnected to the filtration media such that the media holding band is movable along an outer surface of the filtration media.

EC 60. The drum filtration system of any of the preceding or subsequent example combinations, wherein the media holding band is connected to the filtration media such that the media holding band is pre-positioned relative to the filtration media.

EC 61. The drum filtration system of any of the preceding or subsequent example combinations, wherein the connector is a hook and loop connector comprising: a first portion proximate the first end and on a first surface of the strap that extends from the first end to the second end; and a second portion engageable with the first portion, the second portion proximate the second end and on a second surface of the strap that is opposite the first surface.

EC 62. The drum filtration system of any of the preceding or subsequent example combinations, wherein the connector comprises: a strap holder comprising: a body; a first attachment portion configured to connect with the first end of the strap, wherein the first attachment portion is slidable along the body and comprises a first securing slot; a second attachment portion opposite the first attachment portion and configured to connect with the second end of the strap, wherein the second attachment portion is slidable along the body and comprises a second securing slot aligned with the first securing slot; a positioner positionable within the aligned first securing slot and second securing slot, wherein the positioner is configured to selectively restrict sliding of the first attachment portion and the second attachment portion; and a tensioning mechanism configured to selectively adjust a distance between the first attachment portion and the second attachment portion, wherein the tensioning mechanism is detachable from the strap holder.

EC 63. The drum filtration system of any of the preceding or subsequent example combinations, further comprising the filtration media and a band installer configured to tension the media holding band during installation such that the media holding band holds the filtration media relative to the rotary drum, wherein the band installer comprises: a body comprising a first end, a second end opposite the first end, and a gripping material on at least part of an outer surface of the body at the second end; two support tabs at the first end of the body and extending substantially parallel outward from the body, wherein the support tabs define a strap-receiving area between the support tabs; and a securing pin removably connected to the two support tabs, wherein the securing pin is configured to engage the first end or the second end of the strap.

EC 64. A media holding band for a drum filtration system comprising: a strap having a first end and a second end opposite the first end, wherein at least one of the first end and the second end of the strap comprises an attachment loop; and a non-metallic connector configured to secure the first end of the strap relative to the second end of the strap, wherein the non-metallic connector comprises: a first portion proximate the first end and on a first surface of the strap that extends from the first end to the second end; and a second portion engageable with the first portion, the second portion proximate the second end and on a second surface of the strap that is opposite the first surface.

EC 65. The media holding band of any of the preceding or subsequent example combinations, wherein the first portion comprises a first portion length, wherein the second portion comprises a second portion length, and wherein the first portion length and the second portion length are at least a minimum overlap length.

EC 66. The media holding band of any of the preceding or subsequent example combinations, wherein the first portion length and the second portion length are substantially the same, and wherein the minimum overlap length is 24 inches.

EC 67. The media holding band of any of the preceding or subsequent example combinations, wherein the connector is attached to the strap through sewing, a bonding agent, or an adhesive.

EC 68. The media holding band of any of the preceding or subsequent example combinations, wherein the strap comprises polymer webbing.

EC 69. A method of installing filtration media on a rotary drum of a drum filtration system, the method comprising: positioning the filtration media on the rotary drum; contacting a strap of a media holding band with the filtration media around a diameter of the rotary drum; and holding the filtration media on the rotary drum by securing a first end of the strap of the media holding band relative to a second end of the strap of the media holding band with a connector of the media holding band.

EC 70. The method of any of the preceding or subsequent example combinations, wherein the connector is a hook and loop connector comprising: a first portion proximate the first end and on a first surface of the strap that extends from the first end to the second end; and a second portion proximate the second end and on a second surface of the strap that is opposite the first surface, wherein securing the first end of the strap of the media holding band relative to the second end of the strap comprises engaging the first portion with the second portion.

EC 71. The method of any of the preceding or subsequent example combinations, wherein the strap is unconnected to the filtration media, and wherein contacting the strap with the filtration media comprises moving the strap along an outer surface of the filtration media and positioning the strap relative to the filtration media.

EC 72. The method of any of the preceding or subsequent example combinations, wherein securing the first end of the strap relative to a second end of the strap comprises tensioning the strap with a band installer against the filtration media.

EC 73. The method of any of the preceding or subsequent example combinations, wherein tensioning the strap with the band installer comprises: aligning an attachment loop at the second end of the strap with two support tabs on the band installer; inserting a securing pin through the aligned attachment loop and two support tabs; pulling the first end of the strap through a strap-receiving area defined by the two support tabs; frictionally engaging a portion of the strap proximate the first end with a gripping material on a body of the band installer; and pivoting the band installer such that the connector secures the first end of the strap relative to the second end of the strap.

The above-described aspects are merely possible examples of implementations, merely set forth for a clear understanding of the principles of the present disclosure. Many variations and modifications can be made to the above-described example(s) without departing substantially from the spirit and principles of the present disclosure. All such modifications and variations are included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed is:
1. A drum filtration system comprising:
 a rotary drum;
 a media holding band configured to hold a filtration media on an outer surface of the rotary drum, wherein the media holding band comprises:
  a strap having a first end and a second end opposite the first end; and
  a connector configured to secure the first end of the strap relative to the second end of the strap;

the filtration media, wherein the filtration media is configured to filter a process air pulled through the filtration media and the rotary drum;
a filter enclosure;
at least one suction nozzle; and
a fan,
wherein the rotary drum is rotatable within the filter enclosure,
wherein the at least one suction nozzle is configured to remove particulates that accumulate on the filtration media, and
wherein the fan is configured to pull process air through the filtration media and through the rotary drum to produce filtered air.

2. The drum filtration system of claim 1, wherein the filtration media comprises a filtration media height, wherein the connector comprises a connector height, and wherein the connector height is less than 50% of the filtration media height.

3. The drum filtration system of claim 1, wherein the strap further comprises a first surface extending from the first end to the second end and a second surface opposite the first surface, wherein a distance from the first surface to the second surface is a strap height, and wherein the strap height is less than 25% of a height of the filtration media.

4. The drum filtration system of claim 1, wherein the media holding band is unconnected to the filtration media such that the media holding band is movable along an outer surface of the filtration media.

5. The drum filtration system of claim 1, wherein the media holding band is connected to the filtration media such that the media holding band is pre-positioned relative to the filtration media.

6. The drum filtration system of claim 1, wherein the connector is a hook and loop connector comprising:
a first portion proximate the first end and on a first surface of the strap that extends from the first end to the second end; and
a second portion engageable with the first portion, the second portion proximate the second end and on a second surface of the strap that is opposite the first surface.

7. The drum filtration system of claim 1, wherein the connector comprises:
a strap holder comprising:
a body;
a first attachment portion configured to connect with the first end of the strap, wherein the first attachment portion is slidable along the body and comprises a first securing slot;
a second attachment portion opposite the first attachment portion and configured to connect with the second end of the strap, wherein the second attachment portion is slidable along the body and comprises a second securing slot aligned with the first securing slot; and
a positioner positionable within the aligned first securing slot and second securing slot, wherein the positioner is configured to selectively restrict sliding of the first attachment portion and the second attachment portion; and
a tensioning mechanism configured to selectively adjust a distance between the first attachment portion and the second attachment portion, wherein the tensioning mechanism is detachable from the strap holder.

8. The drum filtration system of claim 1, further comprising the filtration media and a band installer configured to tension the media holding band during installation such that the media holding band holds the filtration media relative to the rotary drum, wherein the band installer comprises:
a body comprising a first end, a second end opposite the first end, and a gripping material on at least part of an outer surface of the body at the second end;
two support tabs at the first end of the body and extending substantially parallel outward from the body, wherein the support tabs define a strap-receiving area between the support tabs; and
a securing pin removably connected to the two support tabs, wherein the securing pin is configured to engage the first end or the second end of the strap.

9. A method of installing filtration media on a rotary drum of a drum filtration system, the method comprising:
positioning the filtration media on the rotary drum;
contacting a strap of a media holding band with the filtration media around a diameter of the rotary drum; and
holding the filtration media on the rotary drum by securing a first end of the strap of the media holding band relative to a second end of the strap of the media holding band with a connector of the media holding band,
wherein the connector is a hook and loop connector comprising:
a first portion proximate the first end and on a first surface of the strap that extends from the first end to the second end; and
a second portion proximate the second end and on a second surface of the strap that is opposite the first surface,
wherein securing the first end of the strap of the media holding band relative to the second end of the strap comprises engaging the first portion with the second portion.

10. The method of claim 9, wherein the strap is unconnected to the filtration media, and wherein contacting the strap with the filtration media comprises moving the strap along an outer surface of the filtration media and positioning the strap relative to the filtration media.

11. The method of claim 9, wherein securing the first end of the strap relative to a second end of the strap comprises tensioning the strap with a band installer against the filtration media.

12. The method of claim 11, wherein tensioning the strap with the band installer comprises:
aligning an attachment loop at the second end of the strap with two support tabs on the band installer;
inserting a securing pin through the aligned attachment loop and two support tabs;
pulling the first end of the strap through a strap-receiving area defined by the two support tabs;
frictionally engaging a portion of the strap proximate the first end with a gripping material on a body of the band installer; and
pivoting the band installer such that the connector secures the first end of the strap relative to the second end of the strap.

13. A drum filtration system comprising:
a rotary drum;
a media holding band configured to hold a filtration media on an outer surface of the rotary drum, wherein the media holding band comprises:
a strap having a first end and a second end opposite the first end; and a connector configured to secure the first end of the strap relative to the second end of the strap; and the filtration media, wherein the filtration media is configured to filter a process air pulled through the filtration media and the rotary drum, wherein the media holding band is unconnected to the filtration media such that the media holding band is movable along an outer surface of the filtration media.

14. A drum filtration system comprising:

a rotary drum; and a media holding band configured to hold a filtration media on an outer surface of the rotary drum, wherein the media holding band comprises:
  a strap having a first end and a second end opposite the first end; and
  a connector configured to secure the first end of the strap relative to the second end of the strap, wherein the connector is a hook and loop connector comprising:
    a first portion proximate the first end and on a first surface of the strap that extends from the first end to the second end; and
    a second portion engageable with the first portion, the second portion proximate the second end and on a second surface of the strap that is opposite the first surface.

15. A drum filtration system comprising:

a rotary drum; and a media holding band configured to hold a filtration media on an outer surface of the rotary drum, wherein the media holding band comprises:
  a strap having a first end and a second end opposite the first end; and
  a connector configured to secure the first end of the strap relative to the second end of the strap, wherein the connector comprises:
    a strap holder comprising:
      a body;
      a first attachment portion configured to connect with the first end of the strap, wherein the first attachment portion is slidable along the body and comprises a first securing slot;
      a second attachment portion opposite the first attachment portion and configured to connect with the second end of the strap, wherein the second attachment portion is slidable along the body and comprises a second securing slot aligned with the first securing slot; and
      a positioner positionable within the aligned first securing slot and second securing slot, wherein the positioner is configured to selectively restrict sliding of the first attachment portion and the second attachment portion; and
    a tensioning mechanism configured to selectively adjust a distance between the first attachment portion and the second attachment portion, wherein the tensioning mechanism is detachable from the strap holder.

16. A drum filtration system comprising:

a rotary drum;

a media holding band configured to hold a filtration media on an outer surface of the rotary drum, wherein the media holding band comprises:
  a strap having a first end and a second end opposite the first end; and
  a connector configured to secure the first end of the strap relative to the second end of the strap;

the filtration media; and a band installer configured to tension the media holding band during installation such that the media holding band holds the filtration media relative to the rotary drum, wherein the band installer comprises:
  a body comprising a first end, a second end opposite the first end, and a gripping material on at least part of an outer surface of the body at the second end;
  two support tabs at the first end of the body and extending substantially parallel outward from the body, wherein the support tabs define a strap-receiving area between the support tabs; and
  a securing pin removably connected to the two support tabs, wherein the securing pin is configured to engage the first end or the second end of the strap.

17. A method of installing filtration media on a rotary drum of a drum filtration system, the method comprising:

positioning the filtration media on the rotary drum;

contacting a strap of a media holding band with the filtration media around a diameter of the rotary drum; and holding the filtration media on the rotary drum by securing a first end of the strap of the media holding band relative to a second end of the strap of the media holding band with a connector of the media holding band, wherein the strap is unconnected to the filtration media, and wherein contacting the strap with the filtration media comprises moving the strap along an outer surface of the filtration media and positioning the strap relative to the filtration media.

18. A method of installing filtration media on a rotary drum of a drum filtration system, the method comprising:

positioning the filtration media on the rotary drum;

contacting a strap of a media holding band with the filtration media around a diameter of the rotary drum; and holding the filtration media on the rotary drum by securing a first end of the strap of the media holding band relative to a second end of the strap of the media holding band with a connector of the media holding band, wherein securing the first end of the strap relative to a second end of the strap comprises tensioning the strap with a band installer against the filtration media.

* * * * *